US012654845B2

(12) United States Patent
Ungar et al.

(10) Patent No.: US 12,654,845 B2
(45) Date of Patent: Jun. 16, 2026

(54) NO-BACK BRAKE FOR A FLIGHT CONTROL ACTUATION SYSTEM AND METHOD

(71) Applicant: The Boeing Company, Chicago, IL (US)

(72) Inventors: Lior Ungar, Lynnwood, WA (US); James A. Mehrtens, Seattle, WA (US)

(73) Assignee: The Boeing Company, Arlington, VA (US)

( * ) Notice: Subject to any disclaimer, the term of this patent is extended or adjusted under 35 U.S.C. 154(b) by 795 days.

(21) Appl. No.: 18/064,347

(22) Filed: Dec. 12, 2022

(65) Prior Publication Data

US 2023/0322364 A1 Oct. 12, 2023

Related U.S. Application Data

(60) Provisional application No. 63/329,550, filed on Apr. 11, 2022.

(51) Int. Cl.
*B64C 13/28* (2006.01)
*F16D 55/24* (2006.01)
(Continued)

(52) U.S. Cl.
CPC .............. *B64C 13/28* (2013.01); *F16D 55/24* (2013.01); *F16D 59/00* (2013.01); *F16D 65/127* (2013.01);
(Continued)

(58) Field of Classification Search
CPC ......... B64C 13/28; F16D 55/24; F16D 59/00; F16D 65/127; F16D 65/186; F16D 2069/004
(Continued)

(56) References Cited

U.S. PATENT DOCUMENTS 4,176,733 A * 12/1979 Twickler ................. F16D 67/00
188/134
4,850,458 A 7/1989 Allan et al.
(Continued)

FOREIGN PATENT DOCUMENTS

CN 111 981 054 11/2020
EP 0 243 050 10/1987
GB 2 019 967 11/1979

OTHER PUBLICATIONS

European Patent Office, Extended European Search Report, App. No. 23157006.0 (Sep. 7, 2023).
(Continued)

*Primary Examiner* — Christopher P Schwartz
(74) *Attorney, Agent, or Firm* — Walters & Wasylyna LLC

(57) ABSTRACT

A no-back brake includes a torque tube and a brake. The brake is configured to be axially displaced in response to a force to prevent the torque tube from rotating. The brake includes a rotor that is concentric with the torque tube and that is fixed to the torque tube so that the rotor rotates with the torque tube. The brake includes a stator that is concentrically mounted on the torque tube so that the torque tube is rotatable relative to the stator. The brake includes a friction device located between the rotor and the stator. The friction device is configured to form a frictional coupling between the rotor and the stator that opposes relative rotational motion between the rotor and the stator when the brake is axially displaced. The frictional device includes a composite material.

21 Claims, 12 Drawing Sheets

(51) Int. Cl.

| | |
|---|---|
| *F16D 59/00* | (2006.01) |
| *F16D 65/12* | (2006.01) |
| *F16D 65/18* | (2006.01) |
| *F16D 69/00* | (2006.01) |

(52) U.S. Cl.
CPC ...... *F16D 65/186* (2013.01); *F16D 2069/004* (2013.01)

(58) Field of Classification Search
USPC ........... 188/134; 192/12 R, 18 R, 223, 223.3
See application file for complete search history.

(56) References Cited

U.S. PATENT DOCUMENTS

| | | | |
|---|---|---|---|
| 5,944,148 A * | 8/1999 | Bae | B64C 13/34 |
| | | | 188/134 |
| 7,143,888 B2 | 12/2006 | Lang | |
| 9,416,832 B1 * | 8/2016 | Murphy | F16D 67/00 |
| 11,097,830 B2 | 8/2021 | Barger | |
| 11,384,805 B2 * | 7/2022 | Pajak | F16D 65/128 |
| 11,440,640 B2 * | 9/2022 | Bae | F16D 9/00 |
| 2020/0189723 A1 * | 6/2020 | Bae | B64C 13/28 |
| 2020/0377063 A1 | 12/2020 | Gaile | |

OTHER PUBLICATIONS

European Patent Office: "Communication pursuant to Article 94(3) EPC," App. No. 23 157 006.0 (Jan. 29, 2026).

* cited by examiner

NO-BACK BRAKE FOR A FLIGHT CONTROL ACTUATION SYSTEM AND METHOD

PRIORITY

This application claims priority from U.S. Ser. No. 63/329,550 filed on Apr. 11, 2022.

FIELD

The present disclosure relates generally to actuator systems and, more particularly, to an improved no-back brake for a flight control actuation system.

BACKGROUND

An aircraft utilizes actuation systems for control of aircraft flight surfaces. Such actuation systems transmit torque to actuators through torque transmission devices including torque tubes and gear boxes. If a disconnection failure occurs to a torque transmission device, a no-back brake device will prevent a loss of position control for a given flight surface by grounding the resultant torque generated by air loads on the flight control surface to a structural ground and thereby lock the surface in a fixed position. However, friction devices used in no-back brake devices may wear out before a desired end of life. Additionally, certain friction devices are not suitable for withstanding the high temperatures experienced during operation of the no-back brake device. Further, no-back brake devices may be susceptible to chatter under certain operating conditions. Excessive chatter may result in early wear-out that results in degraded performance, increased maintenance costs, and down-time.

Accordingly, those skilled in the art continue with research and development efforts in the field of no-back brake devices for flight control actuation systems.

SUMMARY

Disclosed are examples of a no-back brake, a flight control actuation system, a method. The following is a non-exhaustive list of examples, which may or may not be claimed, of the subject matter according to the present disclosure.

In an example, the disclosed no-back brake includes a torque tube and a brake. The brake is configured to be axially displaced in response to a force to prevent the torque tube from rotating. The brake includes a rotor that is concentric with the torque tube and that is fixed to the torque tube so that the rotor rotates with the torque tube. The brake includes a stator that is concentrically mounted on the torque tube so that the torque tube is rotatable relative to the stator. The brake includes a friction device located between the rotor and the stator. The friction device is configured to form a frictional coupling between the rotor and the stator that opposes relative rotational motion between the rotor and the stator when the brake is axially displaced. The frictional device includes a composite material.

In another example, the disclosed no-back brake includes a torque tube and a brake. The brake is configured to be displaced in response to a force to prevent the torque tube from rotating. The brake includes a drag brake section. The drag-brake section includes a plurality of drag-brake stators and a plurality of drag-brake rotors that are alternatingly arranged along a first portion of the torque tube. The brake includes a main brake section. The main brake section includes a plurality of main-brake stators and a plurality of main-brake rotors that are alternatingly arranged along a second portion of the torque tube. The brake includes a plurality of friction devices. One of the plurality of friction devices is located between each one of the plurality of drag-brake stators and the plurality of drag-brake rotors and one of the plurality of friction devices is located between each one of the plurality of main-brake stators and the plurality of main-brake rotors. Each one of the plurality of drag-brake rotors and each one of the plurality of main-brake rotors is concentric with the torque tube and is fixed to the torque tube so that each one of the plurality of drag-brake rotors and each one of the plurality of main-brake rotors rotates with the torque tube. Each one of the plurality of drag-brake stators and each one of the plurality of main-brake stators is concentrically mounted on the torque tube so that the torque tube is rotatable relative to each one of the plurality of drag-brake stators and each one of the plurality of main-brake stators. Each one of the friction devices is configured to form a frictional coupling between a corresponding pair of the plurality of drag-brake stators and the plurality of drag-brake rotors and between a corresponding pair of the plurality of main-brake stators and the plurality of main-brake rotors. The frictional coupling opposes relative rotational motion between the plurality of drag-brake stators and the plurality of drag-brake rotors and relative rotational motion between the plurality of main-brake stators and the plurality of main-brake rotors when the brake is displaced. Each one of the friction devices includes a composite material.

In an example, the disclosed flight control actuation system includes a dynamic aerodynamic surface that is moveable relative to a static aerodynamic surface. The flight control actuation system includes an actuator assembly to drive movement of dynamic aerodynamic surface in response to a power input. The flight control actuation system includes a no-back brake disposed within the actuator assembly. The no-back brake includes a torque tube that is configured to rotate in response to the power input and a brake that is configured to be displaced in response to a force to prevent the torque tube from rotating. The brake includes a rotor that is concentric with the torque tube and that is fixed to the torque screw so that the rotor rotates with the torque tube. The brake includes a stator that is concentrically mounted on the torque tube so that the torque tube is rotatable relative to the stator. The brake includes a friction device located between the rotor and the stator. The friction device is configured to form a frictional coupling between the rotor and the stator that opposes relative rotational motion between the rotor and the stator when the brake is displaced. The frictional device includes a composite material.

In an example, the disclose method includes steps of: (1) receiving a force at a no-back brake; (2) displacing a brake of the no-back brake in response to the force; and (3) forming a frictional coupling between a rotor of the brake and a stator of the brake that opposes relative rotational motion between the rotor and the stator using a friction device of the brake when the brake is displaced. The rotor is concentric with a torque tube of the no-back brake and is fixed to the torque tube so that the rotor rotates with the torque tube. The stator is concentrically mounted on the torque tube so that the torque tube is rotatable relative to the stator. The friction device is located between the rotor and the stator. The frictional device includes a composite material.

Other examples of the disclosed no-back brake, flight control actuation system, and method will become apparent from the following detailed description, the accompanying drawings, and the appended claims.

DETAILED DESCRIPTION

Referring generally to FIGS. 1-13, the present disclosure is directed to examples of a no-back brake 100. The no-back brake 100 is incorporated as part of an actuator assembly 206 of a flight control actuation system 200 used in the deployment and retraction of a flight control surface, such as trailing-edge flaps and/or leading-edge flaps or slats on an aircraft 300.

In one or more examples, the disclosed no-back brake 100 is implemented as a bi-directional no-back brake device. The examples of the no-back brake 100 and the flight control actuation system 200, according to the present disclosure, provide for improved techniques for implementing a bi-directional no-back brake device. As examples, the disclosed no-back brake 100 provides for increasing service life of a bi-directional no-back brake device, improving effectiveness of a bi-directional no-back brake device, improving high-temperature resistance and heat dissipation in a bi-directional no-back brake device, reducing wear in the bi-directional no-back brake, increasing energy and loading capacities of the bi-directional no-back brake, and/or reducing chatter in a bi-directional no-back brake device.

Figure 1:
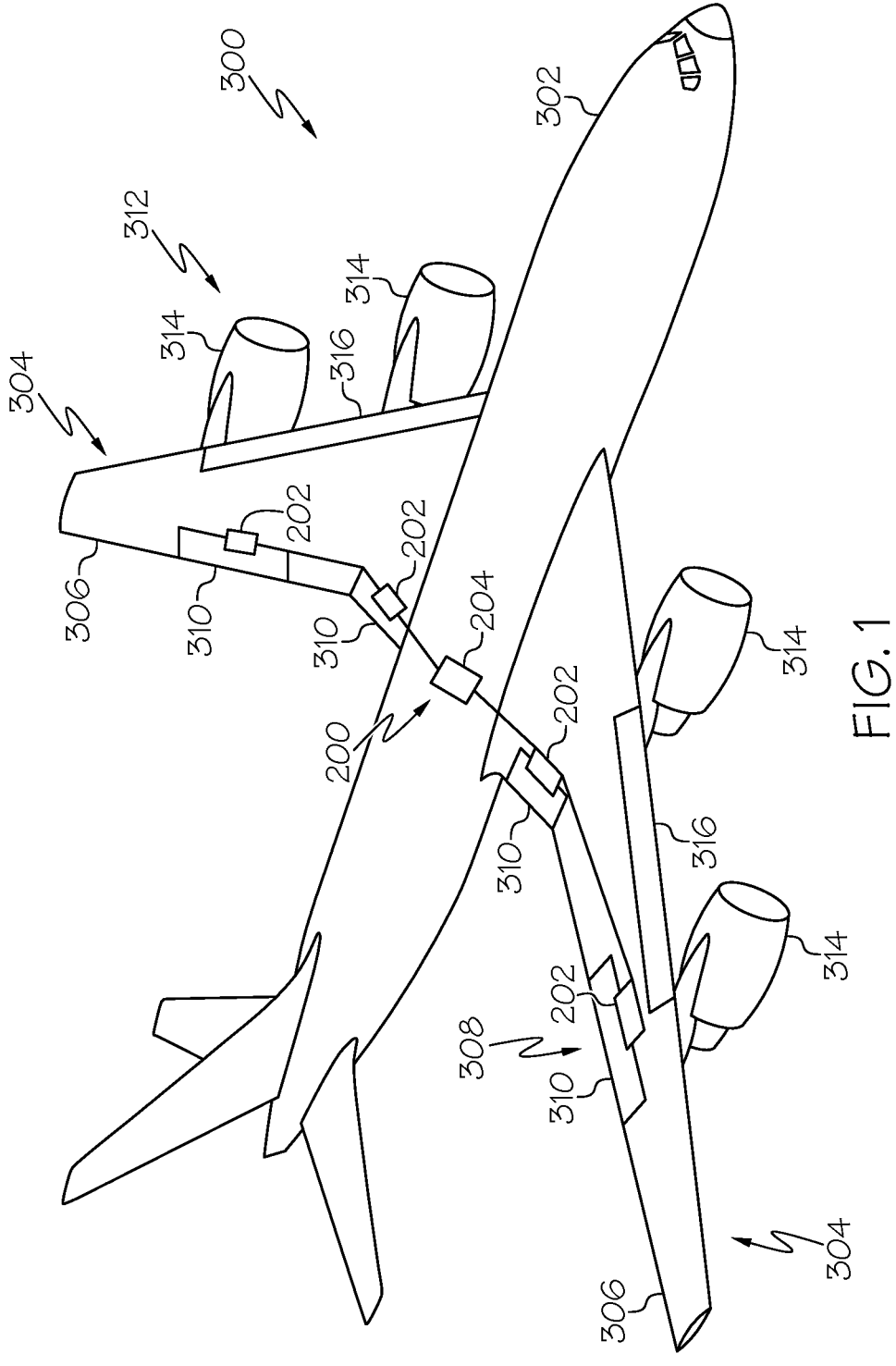
FIG. 1 is a schematic, perspective view of an example of an aircraft.
Figure 2:
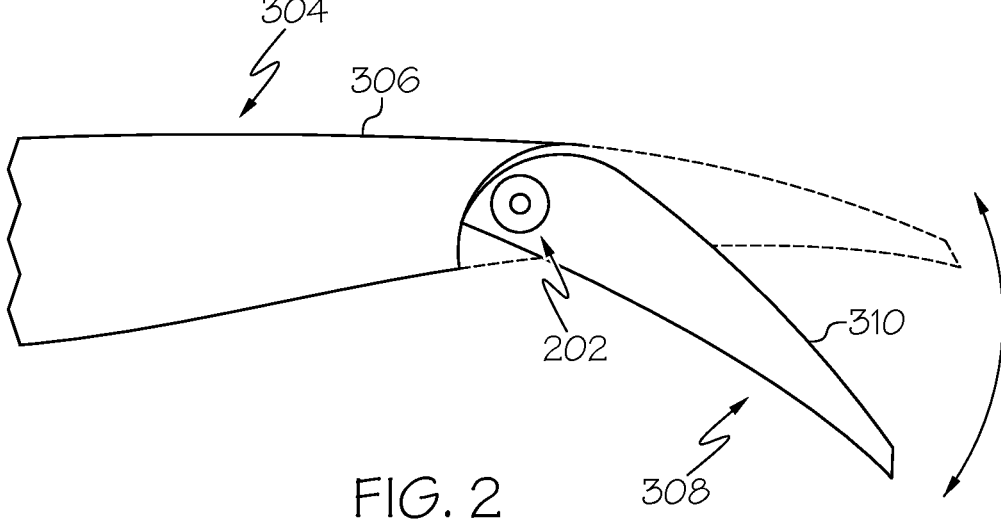
FIG. 2 is a schematic, elevational view of an example of a portion of a wing and a flap.

Referring to FIGS. 1 and 2, the aircraft 300 includes a fuselage 302, static aerodynamic surfaces 304 (e.g., wings 306) that extend outwardly from the fuselage 302, dynamic aerodynamic surfaces 308 (e.g., flaps 310), and a propulsion system 312 (e.g., engines 314). The engines 314 may be attached to the wings 306 or the fuselage 302 and are configured to generate thrust for the aircraft 300. The dynamic aerodynamic surfaces 308 are configured to move relative to the static aerodynamic surfaces 304. Movement of the dynamic aerodynamic surfaces 308 is controlled and driven by the flight control actuation system 200 (e.g., as also shown in FIG. 3).

In one or more examples, the dynamic aerodynamic surfaces 308 are provided as flap control surfaces, hereinafter referred to as the flaps 310. In one or more examples, the flaps 310 are implemented as trailing edge flaps (e.g., are disposed at trailing edges of the wings 306). In one or more examples, the flaps 310 are implemented as leading edge flaps (e.g., are disposed at leading edges of the wings 306). In other examples, the dynamic aerodynamic surfaces 308 are provided as any control surface of the aircraft 300 capable of being deployed and retracted. As an alternative or additional example, the dynamic aerodynamic surface 308 are provided as slat control surfaces, hereinafter referred to as slats 316, which are disposed at leading edges of the wings 306.

In one or more examples, one or more actuators 202 is implemented to deploy and/or retract the flap 310 (e.g., or another dynamic aerodynamic surface 308). As an example, the flaps 310 are configured to move (e.g., be pivoted and/or extended) relative to the wing 306 between a deployed position (e.g., as shown by solid lines in FIG. 2) and a retracted position (e.g., as shown by broken lines in FIG. 2) by the actuators 202 (e.g., flap actuators).

Figure 3:
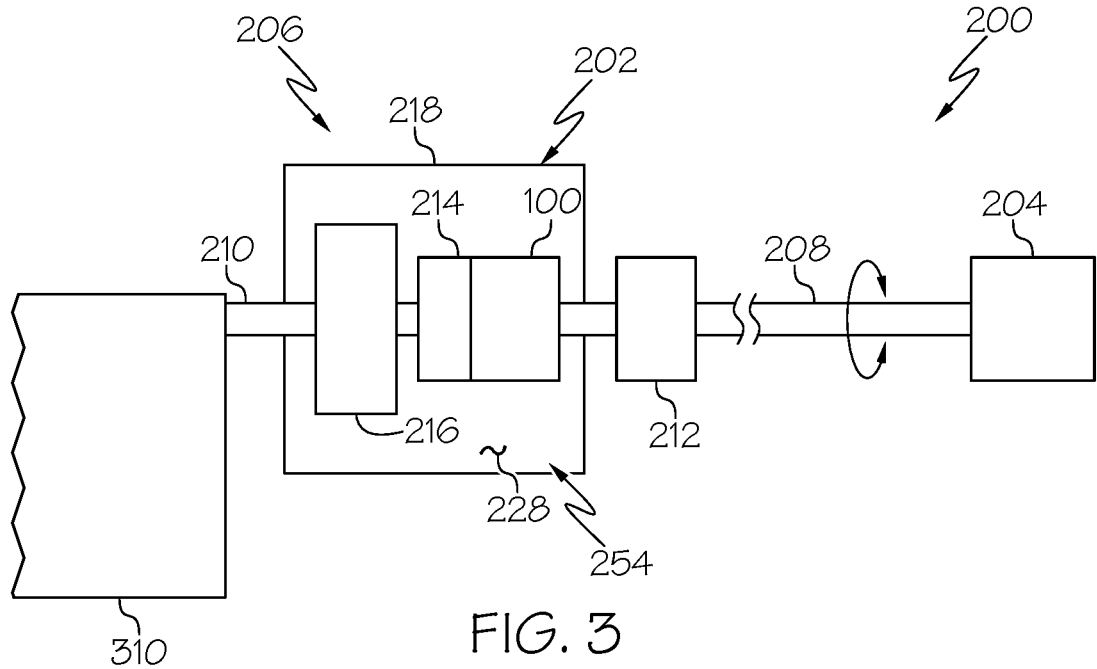
FIG. 3 is a schematic illustration of an example of a flight control actuation system.

Referring to FIG. 3, in one or more examples, the flight control actuation system 200 includes the actuator 202, a power drive unit 204, and the flap 310 (e.g., or another dynamic aerodynamic surface 308). In one or more examples, the actuator 202 of the flight control actuation system 200 forms a portion of the actuator assembly 206 (e.g., a rotary device assembly). The actuator assembly 206 is operably coupled to the wing 306 and to an associated one or more of the flaps 310 to execute the pivoting actions thereof.

The actuator assembly 206 is configured to transmit a first torque from an input shaft 208 (e.g., a drive shaft) to an output shaft 210. The input shaft 208 is rotatable relative to the wing 306. The input shaft 208 is coupled to the power drive unit 204, which controls and drives rotation of the input shaft 208. The output shaft 210 is coupled to and is non-rotatable relative to the flap 310. By way of torque transmission, the actuator assembly 206 is able to control movement (e.g., pivoting and/or extension) of the flap 310.

In one or more examples, the actuator 202 receives a power input to drive movement of the flap 310 to the deployed position or the retracted position. The actuators 202 are controlled and driven by the power drive unit 204 (PDU), which may also be referred to as a power control unit (PCU). As an example, the actuator 202 receives the power input in the form of a rotary drive torque at the input shaft 208. The power drive unit 204 provides the rotary drive torque to deploy and retract the flap 310.

In one or more examples, the power drive unit 204 is implemented as a motor to provide a power drive input to rotate the input shaft 208. In other examples, the power drive unit 204 is implemented as a hydraulic unit to provide the power drive input to rotate the input shaft 208. Other examples of the power drive unit 204, such as a pneumatic unit, are possible in other implementations.

In one or more examples, the flight control actuation system 200 includes a primary brake 212. In one or more examples, the primary brake 212 is a bi-directional no-back brake device. The primary brake 212 may be mounted in the fuselage 302 of the aircraft 300 or may be housed within the actuator assembly 206 (e.g., forming a portion of the actuator assembly 206). In one or more examples, the primary brake 212 relies on axial loading of the input shaft 208 to achieve a brake force application depending on whether the input shaft 208 is driven in an opposing direction (e.g., contrary to a load resulting from an aerodynamic force on the flap 310) or in an aiding direction (e.g., in the same direction as the load resulting from the aerodynamic force on the flap 310).

In one or more examples, the flight control actuation system 200 (e.g., the actuator 202 or the actuator assembly 206) includes the no-back brake 100. In one or more examples, the no-back brake 100 provides or serves as an improved secondary brake that does not rely on the axial loading applied to the input shaft 208. In one or more examples, the no-back brake 100 is implemented as a bi-directional no-back brake. In this regard, the no-back brake 100 is implemented to provide a braking force to the input shaft 208 under conditions when the input shaft 208 is not driven by the power drive unit 204. In addition, the no-back brake 100 provides a braking force to the input shaft 208 in a direction that would result in movement of the flap 310 in a direction of an applied aerodynamic force (e.g., an aiding force). Further, the no-back brake 100 is released in a direction that would result in movement of the flap 310 in a direction contrary to the applied aerodynamic force (e.g., an opposing force).

In one or more examples, the flight control actuation system 200 (e.g., the actuator 202 or the actuator assembly 206) also includes a torque brake 214. In one or more examples, the torque brake 214 is disposed within the actuator 202. In some examples, the torque brake 214 is implemented to provide a torque limiting at the output shaft 210. As an example, the torque brake 214 limits the torque at the output shaft 210 to not exceed a maximum torque threshold of the actuator 202 and/or the flap 310.

In one or more examples, the flight control actuation system 200 (e.g., the actuator 202 or the actuator assembly 206) includes actuator gearing 216. In one or more examples, the actuator gearing 216 is disposed within the actuator 202. The actuator gearing 216 is connected to the input shaft 208 and the output shaft 210 via the no-back brake 100. The actuator gearing 216 is implemented as any suitable gear train or transmission. As an example, the actuator gearing 216 is implemented as an epicyclic gear train (e.g., a planetary gear set). The actuator gearing 216 is implemented with a high gear reduction to provide for efficient performance when deploying or retracting the flaps 310.

While not explicitly illustrated, in one or more examples, the flight control actuation system 200 may include a second actuator (e.g., a second actuator assembly) that includes a second no-back brake, a second toque brake, and second actuator gearing. In these examples, an intermediate shaft connects the actuator gearing 216 of the actuator 202 to the second no-back brake of the second actuator. A second output shaft of the second actuator is connected to flap 310 to provide an output drive torque to the flap 310. In one or more examples, the actuator 202 is positioned at a first end of the flap 310 and the second actuator is positioned a second end of the flap 310. In this regard, the actuator 202 and the second actuator generate sufficient drive torque to operate the flap 310. In some examples, each of the actuators is sized such that either the actuator 202 or the second actuator can deploy and/or retract the flap 310.

Figure 4:
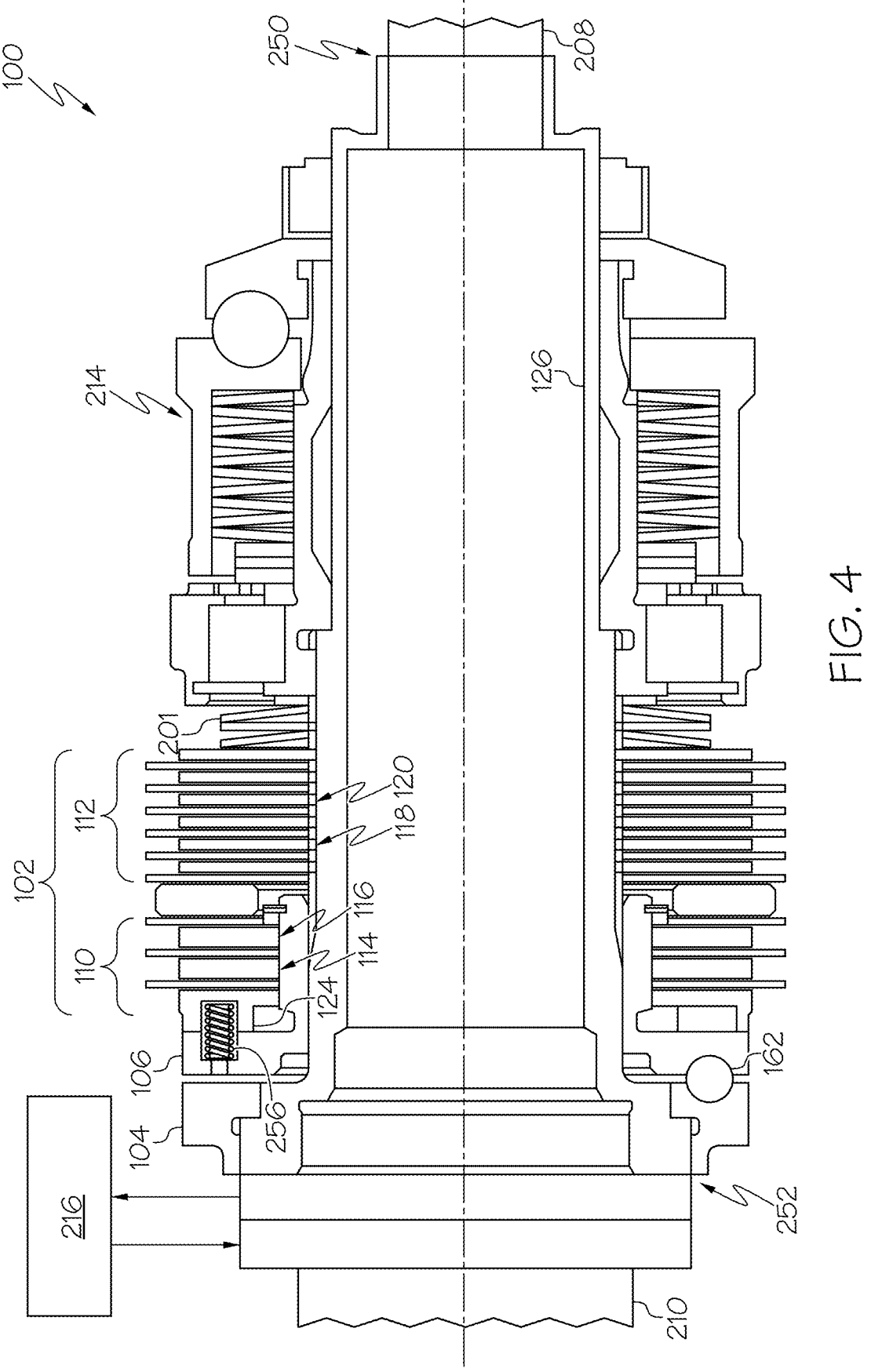
FIG. 4 is a schematic, sectional view of an example of a no-back brake.

Referring now to FIG. 4, which schematically illustrates a cross-section of an example of the no-back brake 100. The no-back brake 100 provides control for movement of the flap 310 (e.g., as shown in FIGS. 1-3). In one or more examples, the no-back brake 100 includes a brake 102 (e.g., a brake section), a reaction plate 104, a ball ramp plate 106, and a spring 108 (e.g., a modulating spring). The no-back brake 100 provides for braking the input shaft 208 when no input power is applied and maintains the flap 310 in a commanded position. Further, the no-back brake 100 provides for braking the input shaft 208 during an aiding load operation.

In one or more examples, the brake 102 (e.g., the brake section) includes a drag brake section 110 and a main brake section 112. The drag brake section 110 and the main brake section 112 perform two different functions. The drag brake section 110 provides for low energy constant braking of the input shaft 208. The main brake section 112 provides for high load braking of the input shaft 208. As an example, the drag brake section 110 prevents the flap 310 from affecting wing lift in a case of flap disconnect and the main brake section 112 prevents excessive torque from being transmitted to the flap 310.

In one or more examples, the input shaft 208 and the output shaft 210 are axially aligned and are coupled to the no-back brake 100. In one or more examples, the no-back brake 100 includes a torque tube 126 (e.g., a torque-transmitting shaft or sleeve). The input shaft 208 is coupled to an input end 250 of the torque tube 126. The output shaft 210 is coupled to an output end 252 of the torque tube 126, for example, via the actuator gearing 216.

In one or more examples, the drag brake section 110 includes a plurality of drag-brake stators 114 and a plurality of drag-brake rotors 116. The drag-brake stators 114 and the drag-brake rotors 116 are arranged on the torque tube 126 in an alternating arrangement between a pressure plate 124 and a spacer 122. The drag-brake stators 114 are non-rotatable relative to the torque tube 126 and provide a ground path to a housing 218 (e.g., as shown in FIG. 3), such as an actuator (e.g., outer) housing or a brake (e.g., inner) housing. The drag-brake rotors 116 are rotatable with the torque tube 126.

In one or more examples, the main brake section 112 includes a plurality of main-brake stators 118 and a plurality of main-brake rotors 120. The main-brake stators 118 and the main-brake rotors 120 are arranged on the torque tube 126 in an alternating arrangement between the spacer 122 and the spring 201. The main-brake stators 118 are non-rotatable relative to the torque tube 126 and provide a ground path to the housing 218 (e.g., as shown in FIG. 3). The main-brake rotors 120 are rotatable with the torque tube 126.

In one or more examples, a number of the main-brake stators 118 and the main-brake rotors 120 of the main brake section 112 is greater than a number of the drag-brake stators 114 and the drag-brake rotors 116 of the drag brake section 110.

Figure 5:
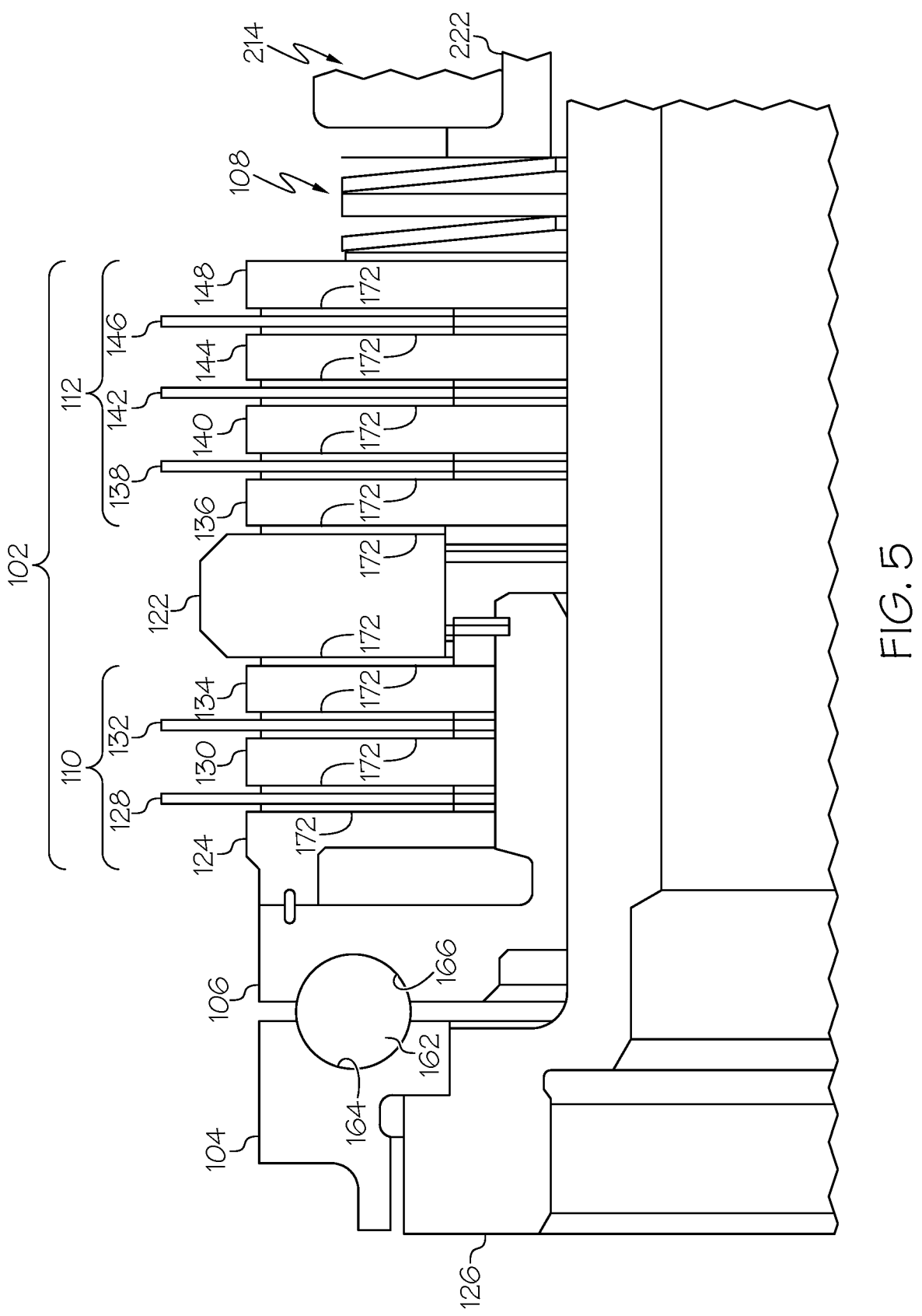
FIG. 5 is a schematic, sectional view of an example of a portion of the no-back brake shown in FIG. 4.

FIG. 5 illustrates an example of the no-back brake 100 that includes a number of main-brake stators 118 and main-brake rotors 120 of the main brake section 112 and a number of drag-brake stators 114 and drag-brake rotors 116 of the drag brake section 110 according to a conventional implementation or design configuration of a bi-directional no-back brake device. As an example, the drag brake section 110 includes two drag-brake stators 114 and two drag-brake rotors 116 alternatingly arranged between the pressure plate 124 and a spacer 122 (e.g., as shown in FIG. 5). The main brake section 112 includes three main-brake stators 118 and four main-brake rotors 120 alternatingly arranged between the spacer 122 and the spring 201 (e.g., as shown in FIG. 5).

In one or more examples of the disclosed no-back brake 100, the drag brake section 110 includes at least one additional drag-brake stator 114 as compared to a drag brake section of a conventional implementation or design configuration of a bi-directional no-back brake device (e.g., as shown in FIG. 5). In one or more examples, the drag brake section 110 includes at least one additional drag-brake stator 114 and at least one additional drag-brake rotor 116 as compared to a drag brake section of a conventional implementation or design configuration of a bi-directional no-back brake device. In one or more examples, the drag brake section 110 includes at least two additional drag-brake stators 114 and at least one additional drag-brake rotor 116 as compared to a drag brake section of a conventional implementation or design configuration of a bi-directional no-back brake device. In one or more examples, the drag brake section 110 includes at least two additional drag-brake stators 114 and at least two additional drag-brake rotors 116 as compared to a drag brake section of a conventional implementation or design configuration of a bi-directional no-back brake device.

In one or more examples of the disclosed no-back brake 100, the main brake section 112 includes at least one additional main-brake stator 118 as compared to a main brake section of a conventional implementation or design configuration of a bi-directional no-back brake device. In one or more examples, the main brake section 112 includes at least one additional main-brake stator 118 and at least one additional main-brake rotor 120 as compared to a main brake section of a conventional implementation or design configuration of a bi-directional no-back brake device. In one or more examples, the main brake section 112 includes at least two additional main-brake stators 118 and at least one additional main-brake rotor 120 as compared to a main brake section of a conventional implementation or design configuration of a bi-directional no-back brake device. In one or more examples, the main brake section 112 includes at least two additional main-brake stators 118 and at least two additional main-brake rotors 120 as compared to a main brake section of a conventional implementation or design configuration of a bi-directional no-back brake device.

Figure 6:
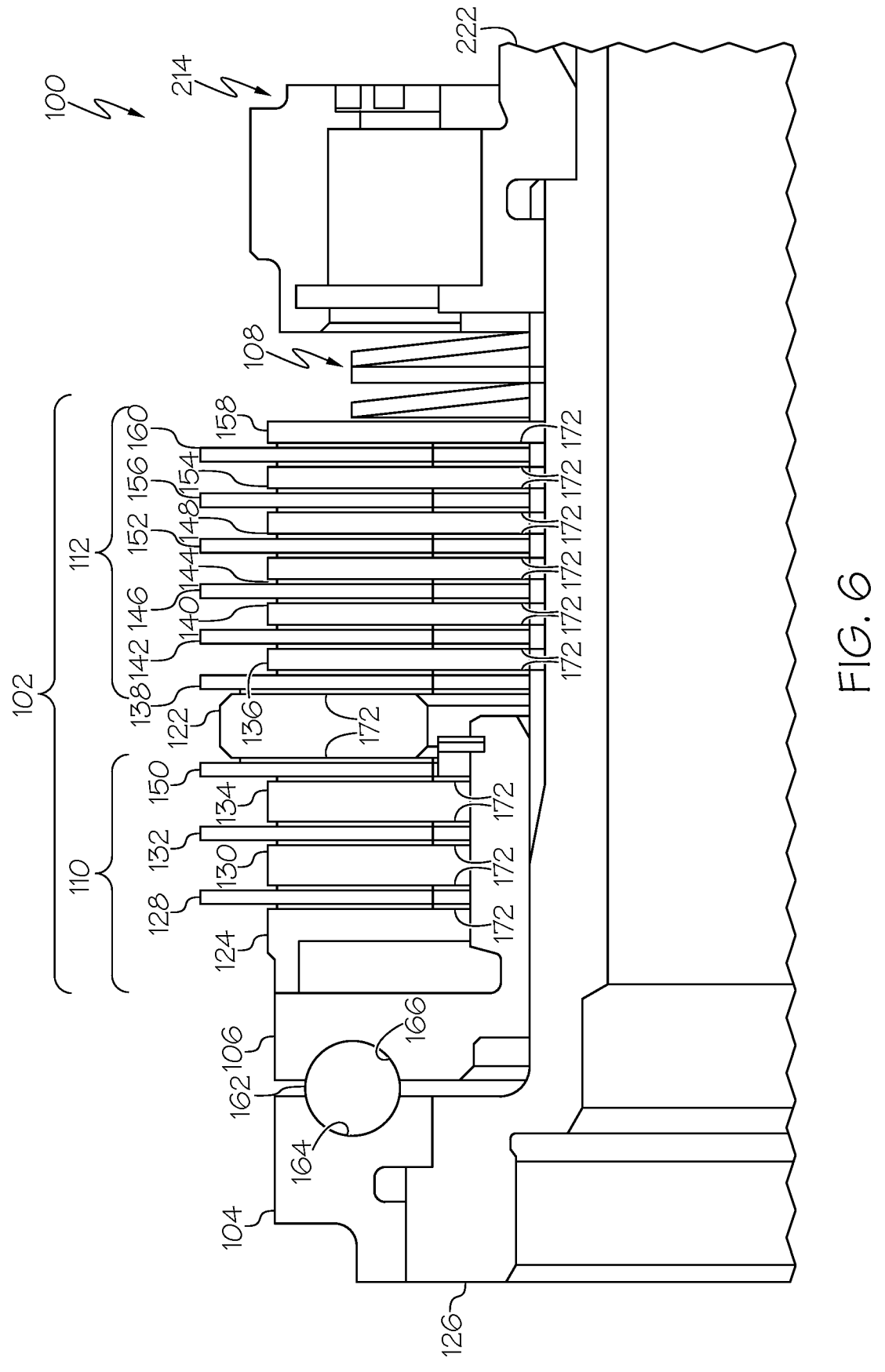
FIG. 6 is a schematic, sectional view of an example of a portion of the no-back brake shown in FIG. 4.

FIGS. 4 and 6 illustrate an example the no-back brake 100 that provides an improved reduction in chatter in the brake 102 over a conventional implementation or design configuration of a bi-directional no-back brake device. Implantations of the no-back brake 100 that include at least one additional drag-brake stator 114 and/or at least one additional drag-brake rotor 116 of the drag brake section 110 reduce chatter in the drag brake section 110 of the no-back brake 100. Implantations of the no-back brake 100 that include at least one additional main-brake stator 118 and/or at least one additional main-brake rotor 120 of the main brake section 112 reduce chatter in the main brake section 112 of the no-back brake 100.

As an example, the drag brake section 110 includes three drag-brake stators 114 and two drag-brake rotors 116 alternatingly arranged between the pressure plate 124 and a spacer 122 (e.g., as shown in FIGS. 4 and 6). The main brake section 112 includes four main-brake stators 118 and four main-brake rotors 120 alternatingly arranged between the spacer 122 and the spring 201.

As another example, the drag brake section 110 includes three drag-brake stators 114 and two drag-brake rotors 116 alternatingly arranged between the pressure plate 124 and a spacer 122 (e.g., as shown in FIGS. 4 and 6). The main brake section 112 includes five main-brake stators 118 and five main-brake rotors 120 alternatingly arranged between the spacer 122 and the spring 201.

As another example, the drag brake section 110 includes three drag-brake stators 114 and two drag-brake rotors 116 alternatingly arranged between the pressure plate 124 and a spacer 122 (e.g., as shown in FIGS. 4 and 6). The main brake section 112 includes six main-brake stators 118 and six main-brake rotors 120 alternatingly arranged between the spacer 122 and the spring 201 (e.g., as shown in FIGS. 4 and 6).

Referring to FIG. 5, in one or more examples, the drag brake section 110 includes the pressure plate 124, a first drag-brake stator 128, a first drag-brake rotor 130, a second drag-brake stator 132, and a second drag-brake rotor 134 arranged on the torque tube 126 between the ball ramp plate 106 and the spacer 122. The first drag-brake stator 128 and the second drag-brake stator 132 are non-rotatable relative to the torque tube 126 and provide a ground path to the housing 218 in the drag brake section 110. The first drag-brake rotor 130 and the second drag-brake rotor 134 are rotatable with the torque tube 126 and relative to the first drag-brake stator 128 and the second drag-brake stator 132.

In one or more examples, the main brake section 112 includes a first main-brake rotor 136, a first main-brake stator 138, a second main-brake rotor 140, a second main-brake stator 142, a third main-brake rotor 144, a third main-brake stator 146, and a fourth main-brake rotor 148 arranged on the torque tube 126 between the spacer 122 and the spring 108. The first main-brake stator 138, the second main-brake stator 142, and the third main-brake stator 146 are non-rotatable relative to the torque tube 126 and provide a ground path to the housing 218 in the main brake section 112. The first main-brake rotor 136, the second main-brake rotor 140, the third main-brake rotor 144, and the fourth main-brake rotor 148 are rotatable with the torque tube 126 and relative to the first main-brake stator 138, the second main-brake stator 142, and the third main-brake stator 146.

Referring to FIG. 6, in one or more examples, the drag brake section 110 includes the pressure plate 124, the first drag-brake stator 128, the first drag-brake rotor 130, the second drag-brake stator 132, the second drag-brake rotor 134, and a third drag-brake stator 150 arranged on the torque tube 126 between the ball ramp plate 106 and the spacer 122. The first drag-brake stator 128, the second drag-brake stator 132, and the third drag-brake stator 150 are non-rotatable relative to the torque tube 126 and provide a ground path to the housing 218 in the drag brake section 110. The first drag-brake rotor 130 and the second drag-brake rotor 134 are rotatable with the torque tube 126 and relative to the first drag-brake stator 128, the second drag-brake stator 132, and the third drag-brake stator 150.

In one or more examples, the main brake section 112 includes first main-brake stator 138, the first main-brake rotor 136, second main-brake stator 142, the second main-brake rotor 140, the third main-brake stator 146, the third main-brake rotor 144, the fourth main-brake stator 152, the fourth main-brake rotor 148, a fifth main-brake stator 156, a fifth main-brake rotor 154, a sixth main-brake stator 160, and a sixth main-brake rotor 158 arranged on the torque tube 126 between the spacer 122 and the spring 108. The first main-brake stator 138, the second main-brake stator 142, the third main-brake stator 146, the fourth main-brake stator 152, the fifth main-brake stator 156, and the sixth main-brake stator 160 are non-rotatable relative to the torque tube 126 and provide a ground path to the housing 218 in the main brake section 112. The first main-brake rotor 136, the second main-brake rotor 140, the third main-brake rotor 144, the fourth main-brake rotor 148, the fifth main-brake rotor 154, and the sixth main-brake rotor 158 are rotatable with the torque tube 126 and relative to the first main-brake stator 138, the second main-brake stator 142, the third main-brake stator 146, the fourth main-brake stator 152, the fifth main-brake stator 156, and the sixth main-brake stator 160.

Referring to FIGS. 4-6, in one or more examples, the spring 108 is coupled between the brake 102 (e.g., the main brake section 112) on a first end and is coupled to a structure 222, such as a structure of the torque brake 214, on a second end. The spring 108 provides for damping of the brake 102 when the brake 102 is displaced to apply a braking action to the input shaft 208 (e.g., shown in FIG. 4) either during operations after the power drive unit 204 (e.g., shown in FIG. 3) has moved the flap 310 (e.g., shown in FIG. 3) in a commanded position or when a back dive air load is present during an aiding load operation.

The spring 108 may have any suitable configuration as is known in the art. In one or more examples, the spring 108 is a modulating spring. In one or more examples, the spring 108 includes a first spring, a cylindrical washer oriented adjacent to the first spring, and a second spring oriented adjacent to the cylindrical washer. In this regard, the spring 108 is configured to progressively compress in response to the displacement of the brake 102.

Referring still to FIGS. 4-6, in one or more examples, the reaction plate 104 and the ball ramp plate 106 are coupled to a ball 162. As an example, the ball 162 is positioned within a first cutout 164 formed in a surface of the reaction plate 104 and a second cutout 166 formed in a surface of the ball ramp plate 106. The combination of the reaction plate 104, the ball 162, and the ball ramp plate 106 axially displaces the brake 102 during one or more of the modes of operation, as described herein.

As illustrated in FIG. 4, in one or more examples, the no-back brake 100 includes at least one second spring 256 (e.g., a constant pressure spring). The second spring 256 is situated or located between the ball ramp plate 106 and the pressure plate 124. The second spring 256 is implemented to provide a constant compressive force. As an example, the second spring 256 is configured to apply a constant force to the pressure plate 124, thereby applying a constant force (e.g., compressive force) to the brake 102 (e.g., the drag brake section 110 and the main brake section 112). Accordingly, the second spring 256 maintains a constant friction coupling between the drag-brake stators 114 and the drag-brake rotors 116 and between the main-brake stators 118 and the main-brake rotors 120. The second spring 256 may have any suitable configuration as is known in the art. Various implementations of the second spring 256 provide for optimal performance under various types of operating and loading conditions of the flight control actuator system 200.

Figure 8:
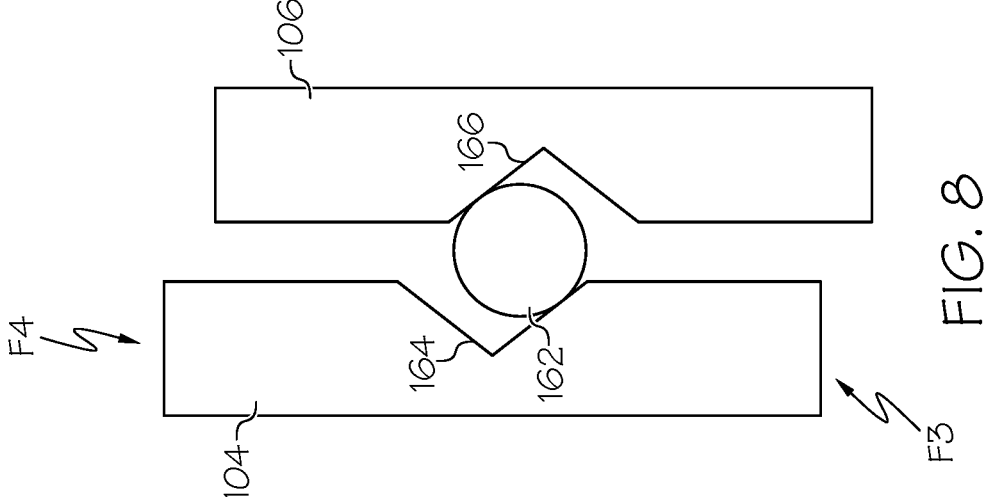
FIGS. 7 and 8 are schematic illustrations of an example of an air loading force applied at the no-back brake shown in FIGS. 4-6.
Figure 7:
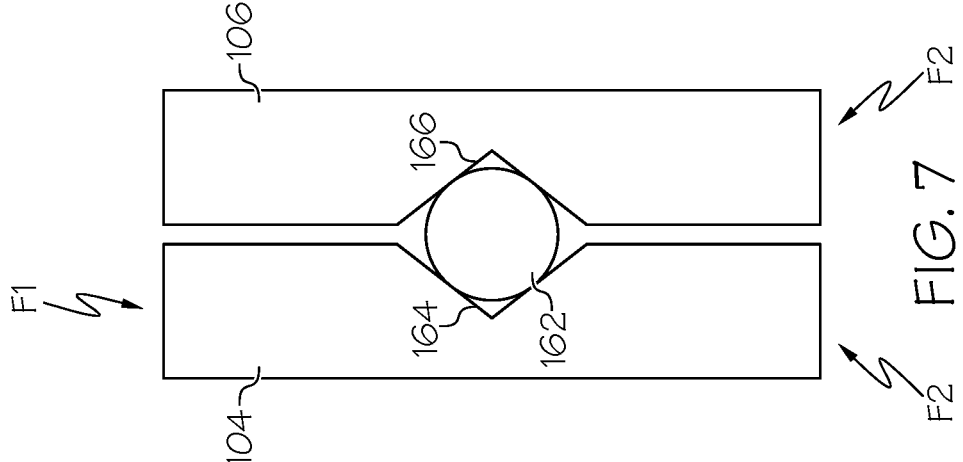

Referring now to FIGS. 7 and 8, which schematically illustrate an example of effects of an air loading force applied at the no-back brake 100. FIG. 7 illustrates an opposing load example when the power drive unit 204 (e.g., shown in FIG. 3) is used to move the flap 310 in a direction opposite an air load force. FIG. 7 shows an air load force F1 applied at the ball ramp plate 106 and an input drive force F2, applied by the power drive unit 204, in an opposite direction at the reaction plate 104. The input drive force F2 at reaction plate 104 is equal to the air load force F1 and torque to slip the drag brake section 110 (e.g., shown in FIGS. 4-6). In this regard, the input drive force F2 aligns the reaction plate 104 and the ball ramp plate 106 such that the ball 162 remains between the first cutout 164 and the second cutout 166. This results in no axial displacement of the brake 102 and the spring 108 is uncompressed.

FIG. 8 illustrates an aiding load example when the power drive unit 204 (e.g., shown in FIG. 3) is used to move the flap 310 in a same direction of an air load force of the flap 310. As illustrated, an aiding air loading force F3 and an input drive force F4 (e.g., as provided by the power drive unit 204) are complementary forces on the ball ramp plate 106 and the reaction plate 104. The input drive force F4 displaces the reaction plate 104 to unlock the brake 102 locked by the aiding air loading force F3.

Figure 9:
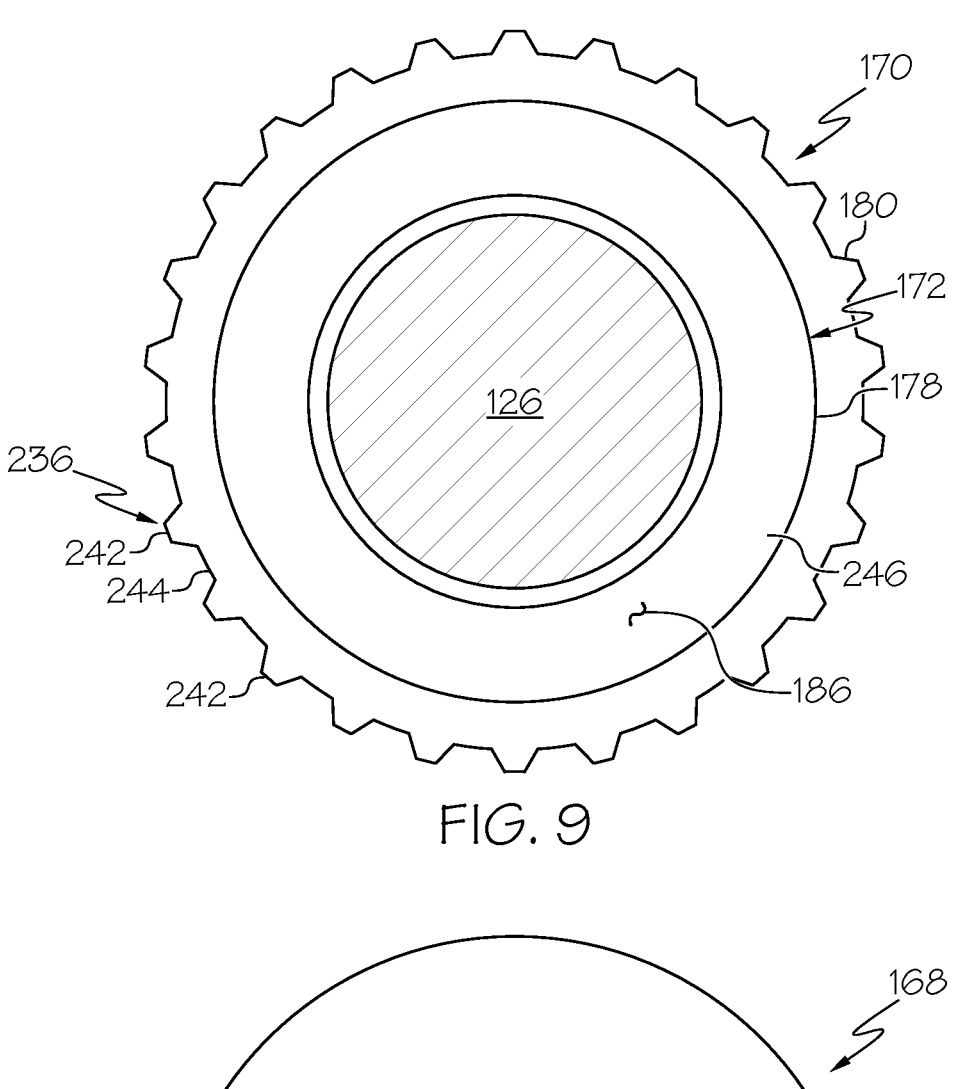
FIG. 9 is a schematic, end elevational view of an example of a stator of the no-back brake shown in FIGS. 4-6.
Figure 10:
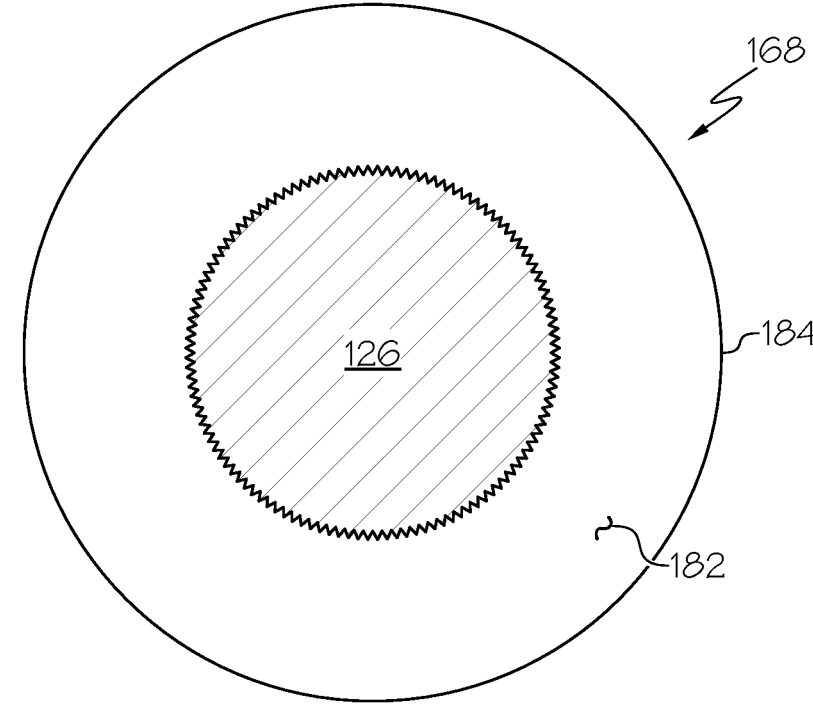
FIG. 10 is a schematic, end elevational view of an example of a rotor of the no-back brake shown in FIGS. 4-6.
Figure 11:
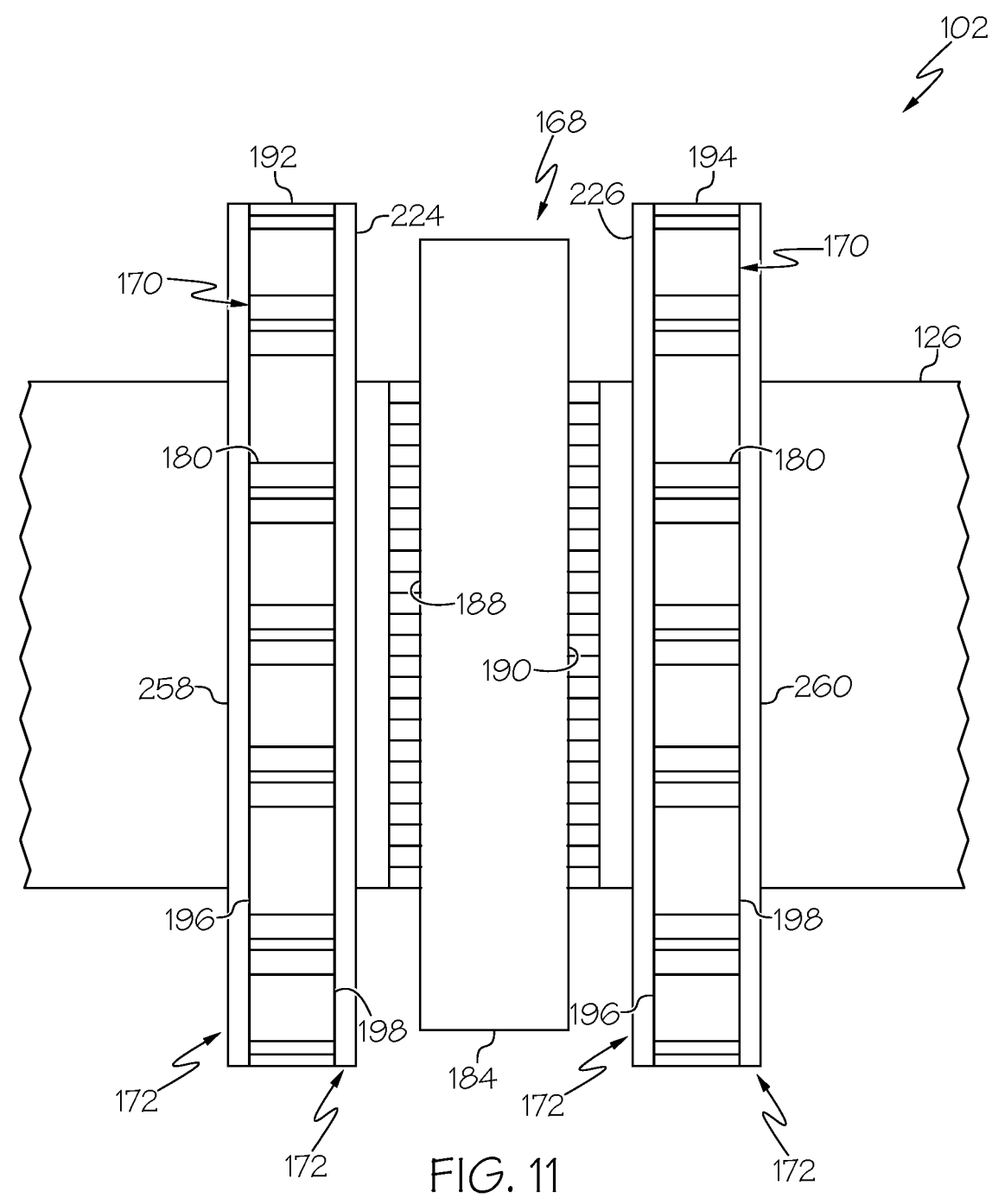
FIG. 11 is a schematic, side elevational view of an example of a portion of a brake of the no-back brake shown in FIGS. 4-6.

The spring 108 (e.g., as shown in FIGS. 4-6) compresses in response to the brake 102 (e.g., shown in FIGS. 4-6) being displaced, and the spring 108 applies a compressive force at the brake 102 corresponding to a distance that the brake 102 is displaced. The spring 108 is implemented to provide a selective compressive force in response to displacement of the brake 102. As an example, as the brake 102 is further axially displaced, the spring 108 responsively increases a compressive force against the brake 102. Various implementations of the spring 108 provide for optimal performance under various types of operating and loading conditions of the flight control actuator system 200. FIG. 9 illustrates an example of a stator 170 of the brake 102. The stator 170 shown in FIG. 9 is an example implementation of any one or each one of the drag-brake stators 114 and the main-brake stators 118. FIG. 10 illustrate an example of a rotor 168 of the brake 102. The rotor 168 shown in FIG. 10 is an example implementation of any one or each one of the drag-brake rotors 116 and the main-brake rotors 120. FIG. 11 illustrates an example of a portion of the brake 102 (e.g., a portion of the drag brake section 110 or the main brake section 112) in which the rotor 168 is arranged between a pair of stators 170 (e.g., a first stator 192 and a second stator 194). The rotor 168 and the pair of stators 170 shown in FIG. 11 are example implementations of any set of drag-brake stators 114 and drag-brake rotors 116 or any set of main-brake stators 118 and main-brake rotors 120.

In one or more examples, the brake 102 includes a plurality of friction devices 172 (e.g., as also shown in FIGS. 5 and 6). As illustrated in FIG. 11, one of the friction devices 172 is situated between each one of the rotors 168 and a directly adjacent one of the stators 170. During operation of the no-back brake 100, constant compression applied to the brake 102, by the second spring 256 (e.g., as shown in FIG. 4), tends to squeeze the rotor 168 and the stator 170 together against the friction device 172 situated between the rotor 168 and the stator 170, thereby providing constant friction therebetween and, thus, a constant braking force (e.g., resistance to rotation of the rotor 168 relative to the stator 170, which is stationary). During operation of the no-back brake 100, progressively greater compression applied to the brake 102, by displacement of the ball ramp plate 106 and compression of the spring 201 (e.g., as shown in FIGS. 4-6), tends to squeeze the rotor 168 and the stator 170 together against the friction device 172 situated between the rotor 168 and the stator 170, thereby increasing friction therebetween and, thus, the braking force (e.g., resistance to rotation of the rotor 168 relative to the stator 170, which is stationary). As such, during operation of the no-back brake 100, the stator 170 (e.g., drag-brake stators 114 and the main-brake stators 118) is implemented as a brake plate.

Referring again to FIG. 5, in one or more examples, the drag brake section 110 includes a plurality of the friction devices 172. One of the friction devices 172 is situated between the pressure plate 124 and the first drag-brake stator 128. One of the friction devices 172 is situated between the first drag-brake stator 128 and the first drag-brake rotor 130. One of the friction devices 172 is situated between the first drag-brake rotor 130 and the second drag-brake stator 132. One of the friction devices 172 is situated between the second drag-brake stator 132 and the second drag-brake rotor 134. One of the friction devices 172 is situated between the second drag-brake rotor 134 and the spacer 122.

In one or more examples, the main brake section 112 includes a plurality of the friction devices 172. One of the friction devices 172 is situated between the spacer 122 and the first main-brake rotor 136. One of the friction devices 172 is situated between the first main-brake rotor 136 and the first main-brake stator 138. One of the friction devices 172 is situated between the first main-brake stator 138 and the second main-brake rotor 140. One of the friction devices 172 is situated between the second main-brake rotor 140 and the second main-brake stator 142. One of the friction devices 172 is situated between the second main-brake stator 142 and the third main-brake rotor 144. One of the friction devices 172 is situated between the third main-brake rotor 144 and the third main-brake stator 146. One of the friction devices 172 is situated between the third main-brake stator 146 and the fourth main-brake rotor 148.

Referring again to FIG. 6, in one or more examples, the drag brake section 110 includes a plurality of the friction devices 172. One of the friction devices 172 is situated between the pressure plate 124 and the first drag-brake stator 128. One of the friction devices 172 is situated between the first drag-brake stator 128 and the first drag-brake rotor 130. One of the friction devices 172 is situated between the first drag-brake rotor 130 and the second drag-brake stator 132. One of the friction devices 172 is situated between the second drag-brake stator 132 and the second drag-brake rotor 134. One of the friction devices 172 is situated between the second drag-brake rotor 134 and the third drag-brake stator 150. One of the friction devices 172 is situated between the third drag-brake stator 150 and the spacer 122.

In one or more examples, the main brake section 112 includes a plurality of the friction devices 172. One of the friction devices 172 is situated between the spacer 122 and the first main-brake stator 138. One of the friction devices 172 is situated between the first main-brake stator 138 and the first main-brake rotor 136. One of the friction devices 172 is situated between the first main-brake rotor 136 and the second main-brake stator 142. One of the friction devices 172 is situated between the second main-brake stator 142 and the second main-brake rotor 140. One of the friction devices 172 is situated between the second main-brake rotor 140 and the third main-brake stator 146. One of the friction devices 172 is situated between the third main-brake stator 146 and the third main-brake rotor 144. One of the friction devices 172 is situated between the third main-brake rotor 144 and the fourth main-brake stator 152. One of the friction devices 172 is situated between the fourth main-brake stator 152 and the fourth main-brake rotor 148. One of the friction devices 172 is situated between the fourth main-brake rotor 148 and the fifth main-brake stator 156. One of the friction devices 172 is situated between the fifth main-brake stator 156 and the fifth main-brake rotor 154. One of the friction devices 172 is situated between the fifth main-brake rotor 154 and the sixth main-brake stator 160. One of the friction devices 172 is situated between the sixth main-brake stator 160 and the sixth main-brake rotor 158.

The present disclosure recognizes that some conventional implementations of a bi-directional no-back brake device include a friction device that is situated between directly adjacent pairs of rotors and stators. Examples of such friction devices include skewed roller brake discs or paper-based friction discs. However, depending on the operating and loading conditions of a bi-directional no-back brake device, conventional implementations of a friction device may not provide sufficient braking force, may not withstand the heat generated during constant braking, or may not maintain a sufficient coefficient of friction for an entire lifecycle (e.g., due to material degradation of the friction device). As such, implementations of the disclosed no-back brake 100 provide material modifications to the rotors 168 and to the friction devices 172 that may improve the braking force provided by the no-back brake 100, improve the heat tolerance (e.g., resistance and dissipation) of the rotors 168 and to the friction devices 172, and improve the coefficient of friction over the life span of the no-back brake 100.

Referring to FIGS. 9 and 11, in one or more examples, the stator 170 includes a stator body 178. The stator body 178 is annular and includes a center opening for situating the stator 170 on the torque tube 126. In one or more examples, an inner diameter surface of the stator body 178 is cylindrical (e.g., smooth) and a portion of the torque tube 126 along which the stator 170 is situated is cylindrical (e.g., smooth) to enable rotation of the torque tube 126 relative to the stator 170, which is non-rotatable and fixed relative to the torque tube 126. In one or more examples, the stator 170 includes a stator spline 180 that extends circumferentially along an outer diameter surface of the stator body 178. The stator spline 180 mates with and engages splining on an interior of the housing 218 (e.g., the actuator housing or the brake housing) to prevent rotation of the stator 170 relative to the housing 218 and relative to the torque tube 126. The splined engagement between the stator 170 and the housing 218 is configured to enable some degree of linear movement of the stator 170 relative to the torque tube 126 (e.g., axially along the torque tube 126) in response to progressively greater compression applied to the brake 102. As an example, the stator spline 180 is configured to enable the stator 170 to linearly move relative to the housing 218 and the torque tube 126 (e.g., axially along the torque tube 126) in response to progressively greater compression applied to the brake 102.

In one or more examples, the friction device 172 is coupled to the stator 170. In one or more examples, the friction device 172 integrated with the stator 170. As an example, the stator 170 or a portion thereof (e.g., a surface of the stator 170 or a portion of the stator body 178) forms the friction device 172 or is otherwise implemented as the friction device 172.

In one or more examples, the friction device 172 includes or is made of a composite material 186. For example, the friction device 172 is implemented as a composite-based friction disc. In one or more examples, the composite material 186 is a fiber-reinforced composite material that includes a matrix material reinforced with a fiber reinforcement material. In one or more examples, the fiber reinforcement material is implemented as a nonwoven fabric-like material (e.g., a nonwoven carbon-fiber composite material) made of short fibers, long fibers, or a combination of short and long fibers that are bound together. In one or more examples, the fiber reinforcement material is carbon fibers, such as non-woven carbon fibers (e.g., the composite material 186 is a carbon-fiber-reinforced polymer material). In other examples, the fiber reinforcement material may include different types of fibers, such as aramid fibers. In one or more examples, the matrix material is a polymer resin or an epoxy. In yet other examples, the friction device 172 is implemented as a ceramic matrix composite. As an example, the composite material 186 includes ceramic fibers embedded in a ceramic matrix.

In one or more examples, the friction device 172 (e.g., the composite material 186) is capable of tolerating large temperature deviations, for example, in a range of approximately −65° F. (−54° C.) to approximately 275° F. (135° C.) without a decrease or degradation of the coefficient of friction of the composite material 186 over the life of the no-back brake 100. The friction device 172 (e.g., the composite material 186) is also capable of withstanding high temperatures, for example, up to approximately 400° F. (205° C.) or 500° F. (260° C.) or even 600° F. (315° C.), without experiencing a decrease or degradation of the coefficient of friction of the composite material 186 over the life of the no-back brake 100. It can be appreciated that the no-back brake 100 experiences high temperatures due to the constant friction applied by the brake 102 during operation.

In one or more examples, the friction device 172 (e.g., the composite material 186 of the friction device 172) has a coefficient of friction of between approximately 0.08 and approximately 0.12. In one or more examples, the composite material 186 of the friction device 172 has a surface roughness less than approximately 0.06 μm Ra.

As a particular example, the composite material 186 of the friction device 172 is a nonwoven carbon-fiber composite friction material, commercially referred to a MC 631 and available from Miba Friction Group of Laakirchen, Austria.

In one or more examples, the stator 170 is the friction device 172. As an example, the stator 170 (e.g., the stator body 178) includes or is made of the composite material 186, such as a carbon-fiber-reinforced composite, a ceramic matrix composite, or the like, as described above.

Implementations of the friction device 172 (or the stator 170) made of the composite material 186, such as the nonwoven carbon-fiber composite friction material (e.g., MC 631) provides high temperature resistance, high heat resistance, and good heat dissipation. Implementations of the friction device 172 made of the composite material 186, such as the nonwoven carbon-fiber composite friction material (e.g., MC 631) also provides a long service life, low wear, and a very consistent coefficient of friction over the life of the no-back brake 100.

Referring to FIGS. 10 and 11, in one or more examples, the rotor 168 includes a rotor body 184. The rotor body 184 is annular and includes a center opening for situating the rotor 168 on the torque tube 126. In one or more examples, an inner diameter surface of the stator body 178 includes a rotor spline and a portion of the torque tube 126 along which the rotor 168 is situated includes a torque-tube spline (e.g., as shown in FIG. 10). The splined engagement between the rotor 168 and the torque tube 126 enables conjoint rotation of the torque tube 126 and the rotor 168 (e.g., upon an input torque applied to the torque tube 126 by the input shaft 208) and prevents rotation of the rotor 168 relative to the torque tube 126. The splined engagement between the rotor 168 and the torque tube 126 is configured to enable some degree of linear movement of the rotor 168 relative to the torque tube 126 (e.g., axially along the torque tube 126) in response to progressively greater compression applied to the brake 102.

In one or more examples, the rotor 168 (e.g., the rotor body 184) includes or is made of a metallic material 182. In one or more examples, the metallic material 182 has a high indentation hardness, for example, as measured by a Rockwell test and represented on a Rockwell C Hardness scale. As a particular example, the metallic material 182 has a Rockwell C Hardness (HRC) value of at least 55. As another particular example, the metallic material 182 has a Rockwell C Hardness (HRC) value of at least 60. As another particular example, the metallic material 182 has a Rockwell C Hardness (HRC) value of at least 64.

In one or more examples, the metallic material 182 is a metallic alloy. In one or more examples, the metallic material 182 is a steel alloy. As a particular example, the metallic material 182 of the rotor 168 is a silicon-vanadium steel alloy, commercially referred to SAE-AISI 4340M.

Implementations of the rotor 168 made of the metallic material 182 having a Rockwell C Hardness value of at least 55 (e.g., SAE-AISI 4340M) reduces or eliminates a tendency for debris disposed between the stator 170 (e.g., the friction device 172) and the rotor 168 to mar or otherwise damage a surface (e.g., a friction interface or contact surface) of the rotor 168.

Referring again to FIG. 11, in one or more examples, the rotor 168 (e.g., the rotor body 184) includes a first rotor surface 188 and a second rotor surface 190, opposite the first rotor surface 188. Each one of the stators 170 (e.g., the first stator 192 and the second stator 194) includes a first stator surface 196 and a second stator surface 198, opposite the first stator surface 196. As arranged on the torque tube 126, the first rotor surface 188 of the rotor 168 faces the second stator surface 198 of the first stator 192 and the second rotor surface 190 of the rotor 168 faces the first stator surface 196 of the second stator 194.

In one or more examples, one of the friction devices 172 (e.g., a first friction device 224) is situated between the first rotor surface 188 of the rotor 168 and the second stator surface 198 of the first stator 192. Another one of the friction devices 172 (e.g., a second friction device 226) is situated between the second rotor surface 190 of the rotor 168 and the first stator surface 196 of the second stator 194. In one or more examples, the first friction device 224 is coupled to the second stator surface 198 of the first stator 192 and the second friction device 226 is coupled to the first stator surface 196 of the second stator 194.

While not explicitly illustrated in FIG. 11, it can be appreciated that, in one or more examples, the brake 102 may include at least one additional rotor 168 and/or at least one additional stator 170 alternatingly arranged along the torque tube 126 (e.g., as shown in FIGS. 4-6). In one or more examples, a second rotor (not shown) may be arranged on the torque tube 126 directly adjacent to the first stator 192 such that the second rotor surface of the second rotor faces the first stator surface 196 of the first stator 192. In these examples, one of the friction devices 172 (e.g., a third friction device 258) is situated between the second rotor surface of the second rotor and the first stator surface 196 of the first stator 192. Similarly, in one or more examples, a third rotor (not shown) may be arranged on the torque tube 126 directly adjacent to the second stator 194 such that the first rotor surface of the third rotor faces the second stator surface 198 of the second stator 194. In these examples, one of the friction devices 172 (e.g., a fourth friction device 260) is situated between the first rotor surface of the third rotor and the second stator surface 198 of the second stator 194.

In one or more examples, the stator 170 (e.g., the first stator 192 and/or the second stator 194) is made of the composite material 186. As such, in one or more examples, the stator 170 is implemented as the friction device 172. For example, the first stator 192 includes or is implemented as the first friction device 224 and the third friction device 258 and the second stator 194 includes or is implemented as the second friction device 226 and the fourth friction device 260.

Upon progressive compression of the brake 102, the first stator 192, the rotor 168, and the second stator 194 are squeezed together. This compression causes the first stator 192 and, thus, the first friction device 224 to frictionally engage (e.g., press against) the rotor 168 and causes the second stator 194 and, thus, the second friction device 226 to frictionally engage (e.g., press against) the rotor 168, thereby increasing the friction between the rotor 168 and the first stator 192 (e.g., via the first friction device 224) and between the rotor 168 and the second stator 194 (e.g., via the second friction device 226) and, thus, increasing the braking force (e.g., resistance to rotation of the rotor 168 relative to the first stator 192 and the second stator 194, which are stationary). Upon progressive decompression of the brake 102, the first stator 192, the rotor 168, and the second stator 194 are released. This decompression causes the first stator 192 and, thus, the first friction device to frictionally disengage the rotor 168 and the second stator 194 and, thus, the second friction device 226 to frictionally disengage the rotor 168, thereby decreasing the friction between the rotor 168 and the first stator 192 (e.g., via the first friction device 224) and between the rotor 168 and the second stator 194 (e.g., via the second friction device 226) and, thus, decreasing the braking force. However, it can be appreciated that a constant frictional coupling between the rotor 168 and the first stator 192 (e.g., via the first friction device 224) and a constant frictional coupling between the rotor 168 and the second stator 194 (e.g., via the second friction device 226) may remain during operation of the no-back brake 100 (e.g., after progressive decompression of the brake 102) due to the constant compressive force applied to the brake 102 by the second spring 256 (e.g., as shown in FIG. 4). Referring again to FIG. 3, in one or more examples, the housing 218 may refer to a housing of the actuator 202, a housing of the actuator assembly 206, or a housing of the no-back brake 100. The housing 218 forms an internal cavity 254. The no-back brake 100 is disposed within the internal cavity 254 of the housing 218. In one or more examples, the actuator gearing 216 is disposed within the internal cavity 254 of the housing 218. In one or more examples, the internal cavity 254 of the housing 218 is an oil-filled cavity (e.g., the housing 218 is at least partially filled with oil 228). In one or more examples, the oil 228 has access to the at least the brake 102 of the no-back brake 100. During operation of the no-back brake 100, the oil 228 dissipates energy as heat and transfers the heat away from the brake 102.

The present disclosure recognizes that conventional implementation of a bi-directional no-back brake device utilizes oil to dissipate and transfer heat away from the brake during operation. However, due to the design configuration of conventional implementations of a bi-directional no-back brake device, oil may not suitably interact with the brake, which may result in higher than desired temperatures and a reduction in the life of the bi-directional no-back brake device. As such, implementations of the disclosed no-back brake 100 provide design modifications to the stators 170 and/or the friction devices 172 that may improve cycling of the oil 228 throughout the brake 102.

Figure 12:
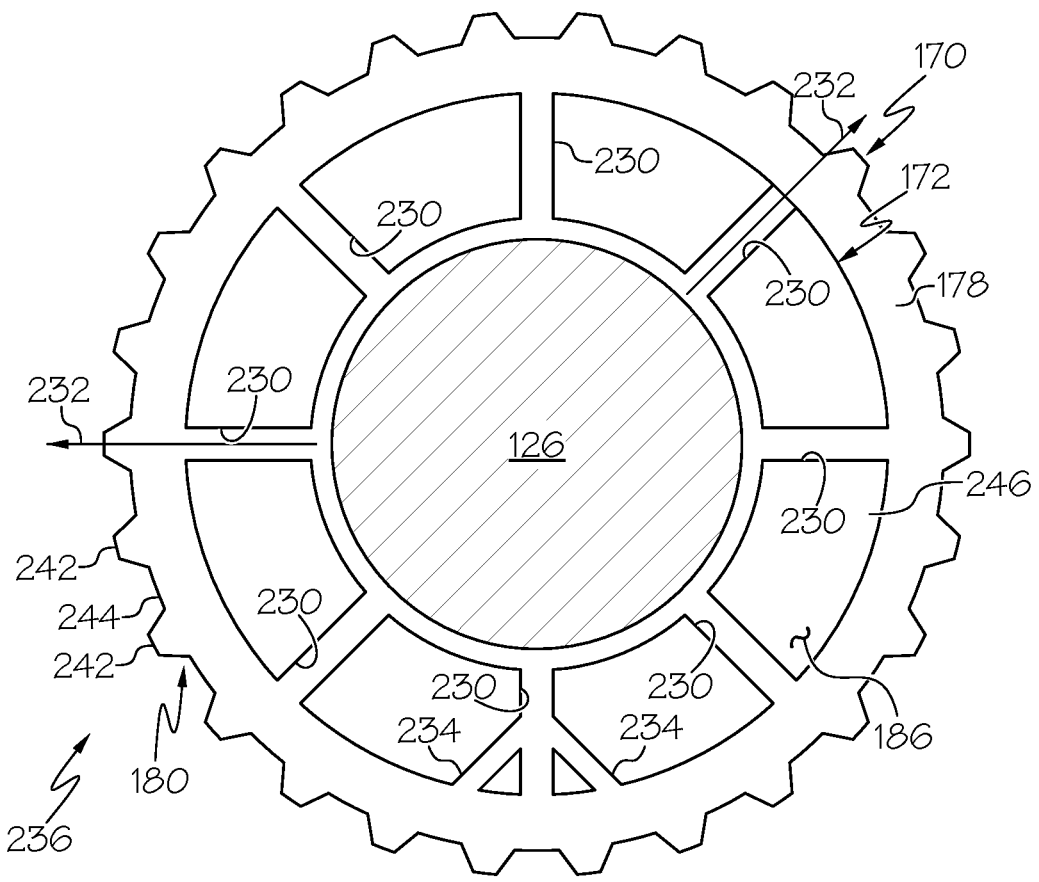
FIG. 12 is a schematic, end elevational view of an example of the stator of the no-back brake shown in FIGS. 4-6.

Referring now to FIG. 12, which illustrates an example of the stator 170. The stator 170 shown in FIG. 12 is an example implementation of any one or each one of the drag-brake stators 114 and/or the main-brake stators 118.

Figure 13:
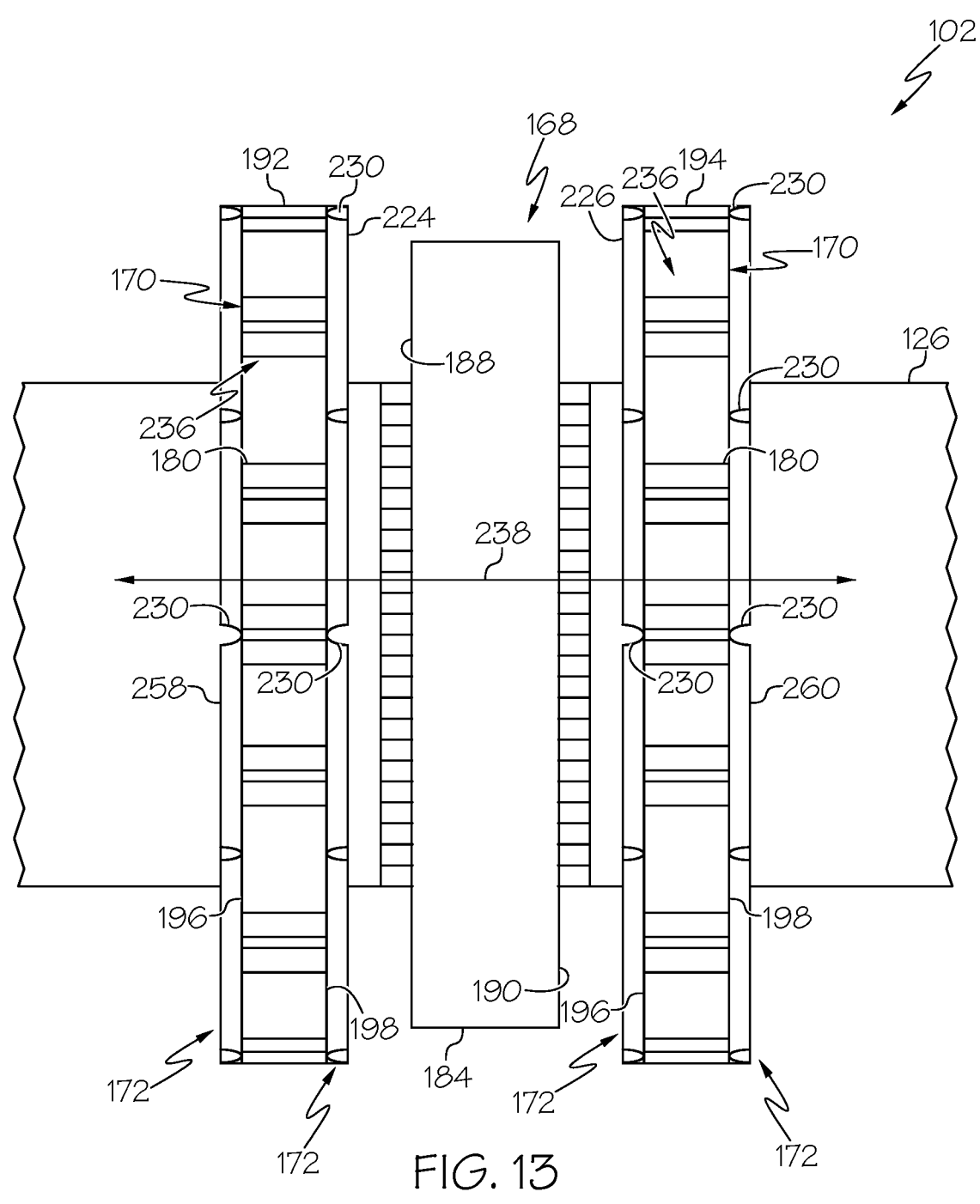
FIG. 13 is a schematic, side elevational view of an example of a portion of the brake of the no-back brake shown in FIGS. 4-6.

In one or more examples, the friction device 172, for example, coupled to the stator 170 (e.g., to the surface of the stator body 178) or implemented as the stator 170 includes a plurality of channels 230. The channels 230 are formed in (e.g., depend inward from) a friction surface 246 of the friction device 172. The channels 230 are configured to transfer the oil 228 (e.g., shown in FIG. 3) along the brake 102 and/or between the rotor 168 and the stator 170 (e.g., as shown in FIG. 13). In one or more examples, the channel 230 is configured to move the oil 228 between the stator 170 (e.g., the friction device 172) and the rotor 168, for example, along the surface of the friction device 172, when the rotor 168 rotates. As an example, during rotation of the rotor 168, the channels 230 direct and move the oil 228 away from the torque tube 126 and toward the housing 218 (e.g., shown in FIG. 3), such as in the direction of directional arrows 232, due to centrifugal force acting on the oil 228.

Implementations of the channels 230 prevent the oil 228 from clogging the frictional interface between the rotor 168 and the stator 170 (e.g., the friction device 172) by enabling the oil 228 to move between the stator 170 (e.g., the friction device 172) and the rotor 168 along the channels 230. As an example, the channels 230 enable the rotor 168 and the stator 170 to touch (e.g., via the friction device 172) without the oil 228 being disposed directly between frictional contact surfaces.

In one or more examples, one or more of the channels 230 extends radially along the friction surface 246 of the friction device 172 from proximate the torque tube 126 to an outer diameter edge of the stator 170. In one or more examples, one or more of the channels 230 is linear (e.g., straight). In one or more examples, one or more of the channels 230 is or non-linear (e.g., includes one or more curved sections). In one or more examples, one or more of the channels 230 may include one or more branches 234 extending from the channel 230. The channels 230 may have any suitable cross-sectional shape, such as a U-shape, a V-shape, or some other shape.

In one or more examples, the channels 230 may be machined in the composite material 186 of the friction device 172 after cure. Alternatively, in one or more examples, the channels 230 may be formed (e.g., molded) in the surface of the composite material 186 of the friction device 172 before cure.

Referring now to FIG. 13, which illustrates an example of a portion of the brake 102 (e.g., a portion of the drag brake section 110 or the main brake section 112) in which the rotor 168 is arranged between a pair of stators 170. The rotor 168 and the pair of stators 170 shown in FIG. 13 are example implementations of any set of drag-brake stators 114 and drag-brake rotors 116 or any set of main-brake stators 118 and main-brake rotors 120.

In one or more examples, the stator spline 180 has a spline profile 236 (e.g., as also shown in FIG. 9). The spline profile 236 of the stator spline 180 is configured to enable the oil 228 (e.g., shown in FIG. 3) to pass across or mover over the stator 170 along the torque tube 126, between the stator 170 and the housing 218, for example, in directions of directional arrow 238.

Referring to FIG. 9, in one or more examples, the stator spline 180 includes a plurality of ridges 242 (e.g., teeth) that extend outwardly from and run along a circumferential surface of the stator 170 (e.g., the stator body 178). Each one of the ridges 242 is angularly spaced away from a directly adjacent one of the ridges 242 such that a valley 244 (e.g., gap or opening) is formed or disposed between any adjacent pair of the ridges 242. With the ridges 242 of the stator spline 180 mated and engaged with the spline on the interior of the housing 218, the valley 244 creates an oil-transfer passage between the stator 170 and an interior surface of the housing 218.

Implementations of the channels 230 formed in the friction surface 246 of the friction device 172 and/or the geometry of the spline profile 236 of the stator spline 180 improve movement (e.g., circulation) of the oil 228 within the internal cavity 254 of the housing 218 (e.g., along the brake 102). Improved movement of the oil 228 facilitates improved oil cooling, thus, preventing the oil 228 from prematurely breaking down due to the temperatures of the brake 102.

According to the present disclosure, in one or more examples, the no-back brake 100 includes the torque tube 126 and the brake 102. The brake 102 is configured to be axially displaced in response to a force to prevent the torque tube 126 from rotating. The brake 102 includes the rotor 168 that is concentric with the torque tube 126 and that fixed to the torque tube 126 so that the rotor 168 rotates with the torque tube 126. The brake 102 includes the stator 170 that is concentrically mounted on the torque tube 126 so that the torque tube 126 is rotatable relative to the stator 170. The brake 102 includes the friction device 172 that is located between the rotor 168 and the stator 170. The friction device 172 is configured to form a frictional coupling between the rotor 168 and the stator 170 that opposes relative rotational motion between the rotor 168 and the stator 170 when the brake 102 is axially displaced. The frictional device 172 includes (e.g., is made of or is implemented as) the composite material 186. The rotor 168 includes (e.g., is made of or is implemented as) the metallic material 182.

According to the present disclosure, in one or more examples, the no-back brake 100 includes the torque tube 126 and the brake 102. The brake 102 is configured to be axially displaced in response to a force to prevent the torque tube 126 from rotating. The brake 102 includes the drag brake section 110. The drag brake section 110 includes the plurality of drag-brake stators 114 and the plurality of drag-brake rotors 116 that are alternatingly arranged along a first portion of the torque tube 126. The brake 102 includes the main brake section 112. The main brake section 112 includes the plurality of main-brake stators 118 and the plurality of main-brake rotors 120 that are alternatingly arranged along a second portion of the torque tube 126. The brake 102 includes the plurality of friction devices 172. One of the plurality of friction devices 172 is located between each one of the plurality of drag-brake stators 114 and the plurality of drag-brake rotors 116. One of the plurality of friction devices 172 is located between each one of the plurality of main-brake stators 118 and the plurality of main-brake rotors 120. Each one of the plurality of drag-brake rotors 116 and each one of the plurality of main-brake rotors 120 is concentric with the torque tube 126 and is fixed to the torque tube 126 so that each one of the plurality of drag-brake rotors 116 and each one of the plurality of main-brake rotors 120 rotates with the torque tube 126. Each one of the plurality of drag-brake stators 114 and each one of the plurality of main-brake stators 118 is concentrically mounted on the torque tube 126 so that the torque tube 126 is rotatable relative to each one of the plurality of drag-brake stators 114 and each one of the plurality of main-brake stators 118. Each one of the friction devices 172 is configured to form a respective frictional coupling between a corresponding pair of the plurality of drag-brake stators 114 and the plurality of drag-brake rotors 116 and between a corresponding pair of the plurality of main-brake stators 118 and the plurality of main-brake rotors 120. The frictional coupling opposes relative rotational motion between the plurality of drag-brake stators 114 and the plurality of drag-brake rotors 116 and relative rotational motion between the plurality of main-brake stators 118 and the plurality of main-brake rotors 120 when the brake 102 is displaced. Each one of the friction devices 172 includes (e.g., is made of or is implemented as) the composite material 186. Each one of the plurality of drag-brake rotors 116 and/or each one of the plurality of main-brake rotors 120 includes (e.g., is made of or is implemented as) the metallic material 182.

According to the present disclosure, in one or more examples, the flight control actuation system 200 includes the dynamic aerodynamic surface 308 (e.g., the flap 310) that is moveable relative to the static aerodynamic surface 304 (e.g., the wing 306). The flight control actuation system 200 includes the actuator assembly 206 to drive movement of dynamic aerodynamic surface 308 in response to a power input. The flight control actuation system 200 includes the no-back brake 100 that is disposed within the actuator assembly 206.

According to the present disclosure, in one or more examples, the no-back brake 100 includes the ball ramp plate 106 that is coupled to the torque tube 126. The no-back brake 100 includes the spring 108 that is coupled to the torque tube 126 and to the brake 102. The ball ramp plate 106 is configured to receive the force and to be displaced in response to the force. The brake 102 is coupled to the ball ramp plate 106 and is configured to be axially displaced by the ball ramp plate 106 corresponding to a distance that the ball ramp plate 106 is displaced. The spring 108 is configured to compress in response to the brake 102 being displaced to apply a selective compressive force at the brake 102 corresponding to a distance the brake 102 is displaced. The ball ramp plate 106 is axially displaced by the force and is configured to move the brake 102 and to compress the spring 108. The force includes an aerodynamically induced air load corresponding to movement of dynamic aerodynamic surface 308 (e.g., the flap 310). The no-back brake 100 also includes the second spring 256 located between the ball ramp plate 106 and pressure plate 124 for applying a constant compressive force to the brake 102.

According to the present disclosure, in one or more examples, the no-back brake 100 includes the spacer 122. The spacer 122 is located between the drag brake section 110 and the main brake section 112 of the brake 102. One of the friction devices 172 is located between the spacer 122 and one of the plurality of drag-brake stators 114 situated directly adjacent to the spacer 122. One of the friction devices 172 is located between the spacer 122 and one of the plurality of main-brake stators 118 situated directly to the spacer 122.

Referring to FIG. 11, by way of examples, the present disclosure is also directed to a method 1000. The method 1000 is an example of a process for using the flight control actuation system 200 or a process for operating the no-back brake 100. In one or more examples, the method 1000 includes a step of (block 1002) receiving a force at the no-back brake 100. The method 1000 includes a step of (block 1004) displacing the brake 102 of the no-back brake 100 in response to the force. The method 1000 includes a step of (block 1006) forming the frictional coupling between the rotor 168 (e.g., any one of the plurality of drag-brake rotors 116 and/or the plurality of main-brake rotors 120) of the brake 102 and the stator 170 (e.g., any corresponding one of the plurality of drag-brake stators 114 and/or the plurality of main-brake stators 118) of the brake 102 that opposes relative rotational motion between the rotor 168 and the stator 170 using the friction device 172 of the brake 102 when the brake 102 is displaced. The rotor 168 is concentric with the torque tube 126 of the no-back brake 100 and is fixed to the torque tube 126 so that the rotor 168 rotates with the torque tube 126. The stator 170 is concentrically mounted on the torque tube 126 so that the torque tube 126 is rotatable relative to the stator 170. The friction device 172 is located between the rotor 168 and the stator 170. The frictional device 172 includes (e.g., is made of or is implemented as) the composite material 186. The rotor 168 includes (e.g., is made of or is implemented as) the metallic material 182.

In one or more examples, according to the method 1000, the force includes an air load associated with the flap 310 of the aircraft 300. In one or more examples, the force includes an aerodynamically induced load corresponding to movement of the flap 310.

In one or more examples, according to the method 1000, the step of (block 1002) receiving the force at the no-back brake 100 includes a step of receiving the force at the ball ramp plate 106 of the no-back brake 100. The method 1000 includes a step of displacing the ball ramp plate 106 in response to the force. The brake 102 is displaced by the ball ramp plate 106 corresponding to a distance that the ball ramp plate 106 is displaced. The method 1000 includes a step of compressing the spring 108 of the no-back brake 100 in response to the brake 102 being displaced. The spring 108 applies a selective compressive force at the brake 102 corresponding to a distance that the brake 102 is displaced. In one or more examples, the step of displacing the ball ramp plate 106 includes a step of axially displacing the ball ramp plate 106 by the force to move the brake 102 and to compress the spring 108.

In one or more examples, the method 1000 includes a step of applying a constant compressive force to the brake 102. The constant compressive force is applied to the brake 102 by the second spring 256 located between the ball ramp plate 106 and the pressure plate 124.

In one or more examples, the method 1000 includes a step of moving the oil 228 along at least one channel 230 formed in the friction surface 246 of the friction device 172 and between the stator 170 and the rotor 168 when the rotor 168 rotates. In one or more examples, the method 1000 includes a step of moving the oil 228 through the stator spline 180, over the stator 170, and between the stator 170 and the housing 218.

Figure 15:
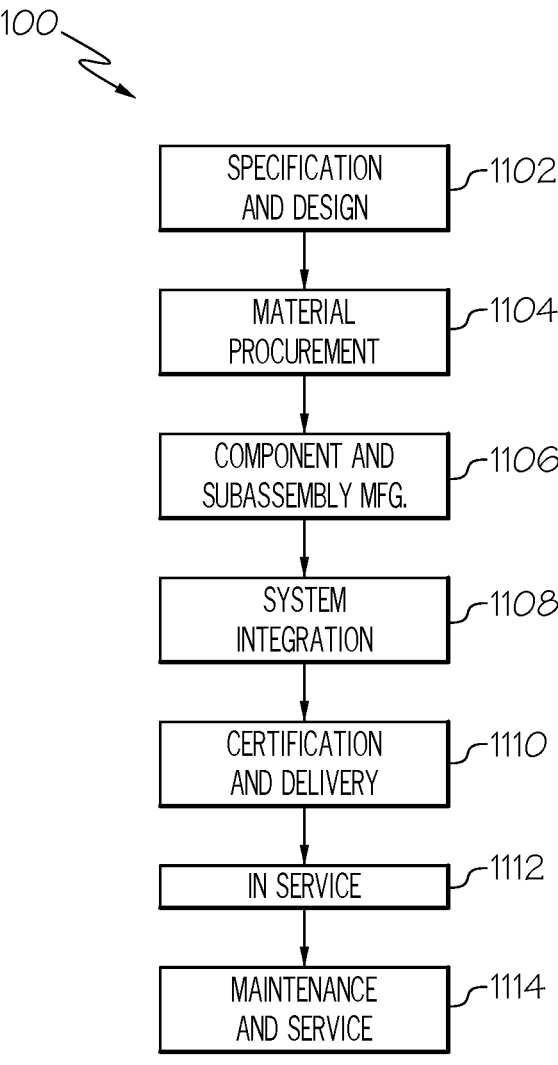
FIG. 15 is a flow diagram of an example aircraft service method.

Referring now to FIGS. 1 and 15, examples of the no-back brake 100, the flight control actuation system 200, and the method 1000 may be related to, or used in the context of, an aircraft manufacturing and service method 1100, as shown in the flow diagram of FIG. 15 and the aircraft 300, as schematically illustrated in FIG. 1. For example, the aircraft 300 and/or the aircraft production and service method 1100 may utilize implementations of the no-back brake 100, the flight control actuation system 200, and the method 1000 for controlling the flight control surfaces of the aircraft 300.

Referring to FIG. 15, during pre-production, the method 1100 includes specification and design of the aircraft 300 (block 1102) and material procurement (block 1104). During production of the aircraft 300, component and subassembly manufacturing (block 1106) and system integration (block 1108) of the aircraft 300 take place. Thereafter, the aircraft 300 goes through certification and delivery (block 1110) to be placed in service (block 1112). Routine maintenance and service (block 1114) includes modification, reconfiguration, refurbishment, etc. of one or more systems of the aircraft 300.

Each of the processes of the method 1100 illustrated in FIG. 15 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the no-back brake 100, the flight control actuation system 200, and the method 1000 shown and described herein, may be employed during any one or more of the stages of the manufacturing and service method 1100 shown in the flow diagram illustrated by FIG. 15. In an example, implementations of the no-back brake 100, the flight control actuation system 200, and the method 1000 may form a portion of component and subassembly manufacturing (block 1106) and/or system integration (block 1108). Further, the no-back brake 100, the flight control actuation system 200, and the method 1000 may be implemented in a manner similar to components or subassemblies prepared while the aircraft 300 is in service (block 1112). Also, implementations of the no-back brake 100, the flight control actuation system 200, and the method 1000 may be utilized during system integration (block 1108) and certification and delivery (block 1110). Similarly, implementations of the no-back brake 100, the flight control actuation system 200, and the method 1000 may be utilized, for example and without limitation, while the aircraft 300 is in service (block 1112) and during maintenance and service (block 1114).

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component, or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-13, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-13, referred to above, need be included in every example and not all elements, features, and/or components described herein are necessarily depicted in each illustrative example. Accordingly, some of the elements, features, and/or components described and illustrated in FIGS. 1-13 may be combined in various ways without the need to include other features described and illustrated in FIGS. 1-13, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-13, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-13, and such elements, features, and/or components may not be discussed in detail herein with reference to each of FIGS. 1-13. Similarly, all elements, features, and/or components may not be labeled in each of FIGS. 1-13, but reference numerals associated therewith may be utilized herein for consistency.

Figure 14:
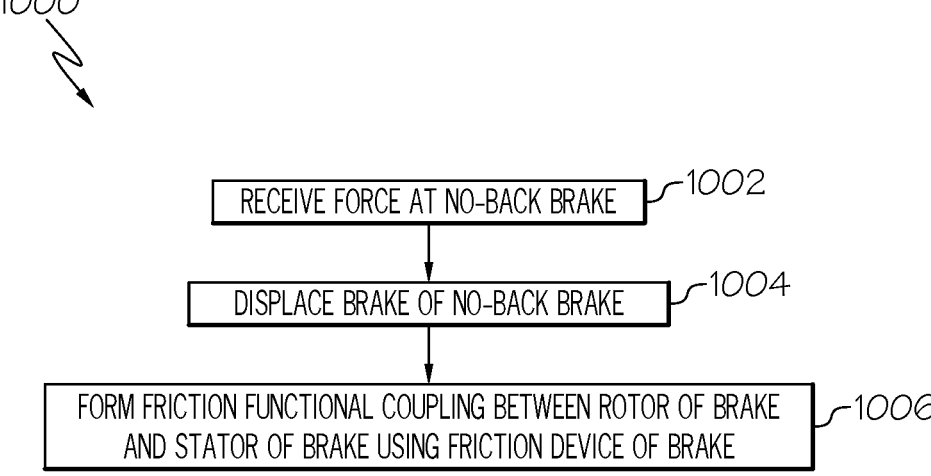
FIG. 14 is a flow diagram of an example of a method for operating a no-back brake.

In FIGS. 14 and 15, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 14 and 15 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the no-back brake 100, the flight control actuation system 200, and the method 1000 have been shown and described, modifications may occur to those skilled in the art upon reading the specification. The present application includes such modifications and is limited only by the scope of the claims.

What is claimed is:

1. A no-back brake comprising:
a torque tube; and
a brake configured to be displaced in response to a force to prevent the torque tube from rotating, wherein the brake comprises:
a rotor concentric with the torque tube and fixed to the torque tube so that the rotor rotates with the torque tube;
a stator concentrically mounted on the torque tube so that the torque tube is rotatable relative to the stator; and
a friction device located between the rotor and the stator,
wherein:
the friction device is configured to form a frictional coupling between the rotor and the stator that opposes relative rotational motion between the rotor and the stator when the brake is displaced;
the frictional device comprises a composite material;
the friction device comprises a friction surface and at least one channel formed in the friction surface; and
the at least one channel is configured to move oil between the stator and the rotor when the rotor rotates.

2. The no-back brake of claim 1, wherein the rotor comprises a metallic material.

3. The no-back brake of claim 2, wherein the metallic material is a metallic alloy.

4. The no-back brake of claim 2, wherein the metallic material is a silicon-vanadium steel alloy.

5. The no-back brake of claim 2, wherein the metallic material of the rotor has a Rockwell C Hardness value of at least 55.

6. The no-back brake of claim 1, further comprising:
a ball ramp plate coupled to the torque tube; and
a spring, coupled to the torque tube and to the brake, wherein:
the ball ramp plate is configured to receive the force and to be displaced in response to the force;
the brake is coupled to the ball ramp plate and is configured to be displaced by the ball ramp plate corresponding to a distance that the ball ramp plate is displaced; and
the spring is configured to compress in response to the brake being displaced to apply a selective compressive force at the brake corresponding to a distance the brake is displaced.

7. The no-back brake of claim 6, wherein the ball ramp plate is axially displaced by the force and is configured to move the brake and to compress the spring.

8. The no-back brake of claim 1, wherein the friction device has a coefficient of friction of between approximately 0.08 and 0.12.

9. The no-back brake of claim 8, wherein the composite material of the friction device is configured to resist temperatures up to approximately 275° F. without experiencing a decrease in the coefficient of friction.

10. The no-back brake of claim 1, further comprising a housing that contains at least a portion of the torque tube and the brake,
wherein the housing forms an internal cavity that is at least partially filled with the oil.

11. The no-back brake of claim 10, wherein:

the stator comprises a stator spline that is coupled to the housing to prevent the stator from rotating when the friction coupling is formed between the rotor and the stator; and
the stator spline has a spline profile configured to enable the oil to move over the stator, between the stator and the housing.

12. The no-back brake of claim 1, wherein the composite material is a fiber-reinforced composite.

13. The no-back brake of claim 1, wherein the composite material is a carbon-fiber-reinforced composite.

14. The no-back brake of claim 1, wherein the composite material is a non-woven carbon-fiber composite.

15. The no-back brake of claim 1, wherein the friction device has a surface roughness of less than approximately 0.06 μm Ra.

16. The no-back brake of claim 1, wherein the friction device is coupled to the stator.

17. The no-back brake of claim 1, wherein at least the one channel extends radially across the friction surface from proximate the torque tube.

18. The no-back brake of claim 1, wherein:
the stator comprises a stator spline configured for coupling to a housing to prevent the stator from rotating when the friction coupling is formed between the rotor and the stator; and
the stator spline has a spline profile configured to enable the oil to move over the stator.

19. A no-back brake comprising:
a torque tube; and
a brake configured to be displaced in response to a force to prevent the torque tube from rotating, wherein the brake comprises:
a drag brake section comprising a plurality of drag-brake stators and a plurality of drag-brake rotors alternatingly arranged along a first portion of the torque tube;
a main brake section comprising a plurality of main-brake stators and a plurality of main-brake rotors alternatingly arranged along a second portion of the torque tube; and
a plurality of friction devices, wherein one of the plurality of friction devices is located between each one of the plurality of drag-brake stators and the plurality of drag-brake rotors and one of the plurality of friction devices is located between each one of the plurality of main-brake stators and the plurality of main-brake rotors,
wherein:
each one of the plurality of drag-brake rotors and each one of the plurality of main-brake rotors is concentric with the torque tube and is fixed to the torque tube so that each one of the plurality of drag-brake rotors and each one of the plurality of main-brake rotors rotates with the torque tube;
each one of the plurality of drag-brake stators and each one of the plurality of main-brake stators is concentrically mounted on the torque tube so that the torque tube is rotatable relative to each one of the plurality of drag-brake stators and each one of the plurality of main-brake stators;
each one of the friction devices is configured to form a frictional coupling between a corresponding pair of the plurality of drag-brake stators and the plurality of drag-brake rotors and between a corresponding pair of the plurality of main-brake stators and the plurality of main-brake rotors that opposes relative rotational motion between the plurality of drag-brake stators and the plurality of drag-brake rotors and relative rotational motion between the plurality of main-brake stators and the plurality of main-brake rotors when the brake is displaced;

each one of the friction devices comprises a composite material;

at least one of the friction devices comprises a friction surface and at least one channel formed in the friction surface; and the at least one channel is configured to move oil between the corresponding pair of the plurality of drag-brake stators and the plurality of drag-brake rotors or between a corresponding pair of the plurality of main-brake stators and the plurality of main-brake rotors in response to rotation.

20. A flight control actuation system comprising:

a dynamic aerodynamic surface that is moveable relative to a static aerodynamic surface;

an actuator assembly to drive movement of dynamic aerodynamic surface in response to a power input; and a no-back brake disposed within the actuator assembly, wherein the no-back brake comprises:

a torque tube configured to rotate in response to the power input; and a brake configured to be displaced in response to a force to prevent the torque tube from rotating, wherein the brake comprises:

a rotor concentric with the torque tube and fixed to the torque tube so that the rotor rotates with the torque tube;

a stator concentrically mounted on the torque tube so that the torque tube is rotatable relative to the stator; and a friction device located between the rotor and the stator, wherein:

the friction device is configured to form a frictional coupling between the rotor and the stator that opposes relative rotational motion between the rotor and the stator when the brake is displaced;

the frictional device comprises a composite material;

the friction device comprises a friction surface and at least one channel formed in the friction surface; and the at least one channel is configured to move oil between the stator and the rotor when the rotor rotates.

21. A method comprising steps of:

receiving a force at a no-back brake;

displacing a brake of the no-back brake in response to the force; and forming a frictional coupling between a rotor of the brake and a stator of the brake that opposes relative rotational motion between the rotor and the stator using a friction device of the brake when the brake is displaced; and moving oil between the stator and the rotor when the rotor rotates, wherein:

the rotor is concentric with a torque tube of the no-back brake and is fixed to the torque tube so that the rotor rotates with the torque tube;

the stator is concentrically mounted on the torque tube so that the torque tube is rotatable relative to the stator; and the friction device is located between the rotor and the stator, the frictional device comprises a composite material, a friction surface, and at least one channel formed in the friction surface; and the at least one channel is configured to move oil between the stator and the rotor.

* * * * *